(12) United States Patent
Fink et al.

(10) Patent No.: US 9,747,089 B2
(45) Date of Patent: *Aug. 29, 2017

(54) AUTOMATIC CONVERSION OF SEQUENTIAL ARRAY-BASED PROGRAMS TO PARALLEL MAP-REDUCE PROGRAMS

(71) Applicant: International Business Machines Corporation, Armonk, NY (US)

(72) Inventors: Stephen Fink, Yorktown Heights, NY (US); Rodric Rabbah, Yonkers, NY (US); Cosmin A. Radoi, Urbana, IL (US); Manu Sridharan, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/519,904

(22) Filed: Oct. 21, 2014

(65) Prior Publication Data

US 2016/0110175 A1    Apr. 21, 2016

(51) Int. Cl.
*G06F 9/44* (2006.01)
*G06F 9/45* (2006.01)

(52) U.S. Cl.
CPC .............. *G06F 8/456* (2013.01); *G06F 8/443* (2013.01); *G06F 8/314* (2013.01); *G06F 8/51* (2013.01)

(58) Field of Classification Search
CPC .. G06F 8/314; G06F 8/40; G06F 8/41–8/427; G06F 8/443; G06F 8/51; G06F 8/456; G06F 8/445

See application file for complete search history.

(56) References Cited

U.S. PATENT DOCUMENTS

| | | | | |
|---|---|---|---|---|
| 5,881,291 | A  * | 3/1999  | Piazza ..................... | G06F 8/423 717/114 |
| 6,182,284 | B1 * | 1/2001  | Sreedhar ................. | G06F 8/433 717/146 |
| 7,197,512 | B2   | 3/2007  | Pharies et al. | |
| 8,131,768 | B2 * | 3/2012  | Sinha ...................... | G06F 8/433 707/792 |
| 8,181,167 | B2   | 5/2012  | Zhao | |
| 8,296,748 | B2   | 10/2012 | Cheng et al. | |
| 8,316,359 | B2   | 11/2012 | Lin | |
| 8,762,964 | B2 * | 6/2014  | Turner ................... | G06F 8/314 707/713 |

(Continued)

FOREIGN PATENT DOCUMENTS

EP         1 901 165 A3    4/2009

OTHER PUBLICATIONS definition for "Computer", Dictionary.com, 1 page, [retrieved on Jun. 27, 2016], Retrieved from the Internet: <URL:http://www.dictionary.com/browse/computer>.*

(Continued)

*Primary Examiner* — Geoffrey St Leger
(74) *Attorney, Agent, or Firm* — Scully, Scott, Murphy & Presser, P.C.; Rabin Bhattacharya

(57) ABSTRACT

The present disclosure relates generally to the field of automatic conversion of sequential array-based programs to parallel MapReduce programs. In various examples, automatic conversion of sequential array-based programs to parallel MapReduce programs may be implemented in the form of systems, methods and/or algorithms.

10 Claims, 18 Drawing Sheets

(56) References Cited

U.S. PATENT DOCUMENTS

| | | | | |
|---|---|---|---|---|
| 8,887,156 | B2* | 11/2014 | Chambers | G06F 9/445 |
| | | | | 712/220 |
| 9,086,931 | B2* | 7/2015 | Vargas | G06F 8/51 |
| 2003/0101441 | A1* | 5/2003 | Harrison, III | G06F 8/4441 |
| | | | | 717/152 |
| 2005/0108696 | A1* | 5/2005 | Dai | G06F 8/456 |
| | | | | 717/151 |
| 2007/0038985 | A1* | 2/2007 | Meijer | G06F 8/51 |
| | | | | 717/137 |
| 2007/0067761 | A1 | 3/2007 | Ogilvie et al. | |
| 2007/0234276 | A1* | 10/2007 | Ottoni | G06F 8/314 |
| | | | | 717/104 |
| 2008/0092113 | A1 | 4/2008 | Weinstein et al. | |
| 2008/0127146 | A1 | 5/2008 | Liao et al. | |
| 2009/0064117 | A1* | 3/2009 | Bashkansky | G06F 8/443 |
| | | | | 717/154 |
| 2009/0193402 | A1* | 7/2009 | Bashkansky | G06F 8/443 |
| | | | | 717/145 |
| 2009/0281999 | A1* | 11/2009 | Sinha | G06F 8/433 |
| 2010/0241828 | A1* | 9/2010 | Yu | G06F 8/456 |
| | | | | 712/30 |
| 2011/0271261 | A1 | 11/2011 | Kantamneni et al. | |
| 2011/0276962 | A1* | 11/2011 | Chambers | G06F 9/445 |
| | | | | 718/1 |
| 2011/0314256 | A1 | 12/2011 | Callahan, II et al. | |
| 2012/0079468 | A1 | 3/2012 | Gringauze et al. | |
| 2012/0159459 | A1* | 6/2012 | Turner | G06F 8/314 |
| | | | | 717/138 |
| 2014/0122832 | A1* | 5/2014 | Ngai | G06F 9/30036 |
| | | | | 712/7 |
| 2014/0157243 | A1* | 6/2014 | Vargas | G06F 8/51 |
| | | | | 717/137 |

OTHER PUBLICATIONS

Zhao, J., et al., Loop Parallelisation for the Jikes RVM, Sixth International Conference on Parallel and Distributed Computing, Applications and Technologies, 2005, 5 pages, [retrieved on Jun. 14, 2016], Retrieved from the Internet: <URL:http://ieeexplore.ieee.org/>.*

Jung, A., A short introduction to the Lambda Calculus, Mar. 18, 2004, 10 pages, [retrieved on Jun. 14, 2016], Retrieved from the Internet: <URL:http://cs.nyu.edu/wies/teaching/pl-12/material/lambda-calculus.pdf>.*

Knobe, K., et al., Array SSA form and its use in Parallelization, Proceedings of the 25th ACM SIGPLAN-SIGACT symposium on Principles of programming languages, 1998, pp. 107-120, [retrieved on Jun. 14, 2016], Retrieved from the Internet: <URL:http://dl.acm.org/>.*

Radoi, C., et al., Translating Imperative Code to MapReduce, Proceedings of the 2014 ACM International Conference on Object Oriented Programming Systems Languages & Applications, 2014, pp. 909-927, [retrieved on Jun. 14, 2016], Retrieved from the Internet: <URL:http://dl.acm.org/>.*

"Apache Hadoop", http://hadoop.apach.org/, Printed: Jan. 15, 2015, pp. 1-6.

"Apache Spark—Lightning-Fast Cluster Computing", http://spark.apache.org/, Printed: Jan. 15, 2015, pp. 1-4.

Dean, J., et al., "MAPREDUCE: Simplified Data Processing on Large Clusters", Communications of the ACM, (Jan. 2008), vol. 51, No. 1, pp. 107-113.

Bird, R.S., Algebraic Identities for Program Calculation, The Computer Journal, (Apr. 1989), vol. 32, No. 2, pp. 122-126.

Laemmel, R., et al., "Google's MapReduce programming model— Revisited", Science of Computer Programming, (2008), vol. 70, pp. 1-30.

Appel, A.W., et al., "SSA is Functional Programming", SIGPLAN Not, (Apr. 1998), vol. 33, No. 4, pp. 17-20.

"T.J. Watson Libraries for Analysis", http://wala.sourceforge.net/wiki/index.php/Main_Page, WalaWiki, Printed: Jan. 14, 2015, pp. 1-2.

Braun, M., et al., "FIRM—A Graph-Based Intermediate Representation", Chamonix, (2011), Workshop on Intermediate Representations, pp. 61-68.

Schkufza, E. et al., "Stochastic Superoptimization", ASPLOS, (2013), pp. 305-316.

Meijer, E., et al., "Functional Programming with Bananas, Lenses, Envelopes and Barbed Wire", FPCA '91, (1991), pp. 1-16.

Vavilapalli, V.K., et al., "Apache Hadoop YARN: Yet Another Resource Negotiator", SOCC'13, (2013), 16 pages.

Strout, M.M. et al., "Compile-time Composition of Run-time Data and Iteration Reorderings", PLDI'03, (2003), 12 pages.

Ranger, C. et al., "Evaluating MapReduce for Multi-core and Multiprocessor Systems", HPCA'07, (2007), 12 pages.

Ramsey, N., "Unparsing Expressions With Prefix and Postfix Operators", Software: Practice and Experience, (Apr. 13, 1998), vol. 28, No. 12, 28 pages.

Oliveira, B.C., et al., "Type Classes as Objects and Implicits", OOPSLA'10, (2010), 20 pages.

Nugteren, C., et al., "Introducing 'Bones': A Parallelizing Source-to-Source Compiler Based on Algorithmic Skeletons", GPGPU, (2012), 10 pages.

Knobe, K., et al., "Array SSA form and its use in Parallelization", POPL'98, (1998), pp. 107-120.

Klonatos, Y., et a., "Automatic Synthesis of Out-of-Core Algorithms", SIGMOD'13, (2013), 12 pages.

Kelsey, R.A., "A Correspondence between Continuation Passing Style and Static Single Assignment Form", IR'95, (1995), 10 pages.

Joshi, R., et al., "Denali: A Goal-directed Superoptimizer", PLDI'02, (2002), pp. 304-314.

Gulwani, S., et al., "Synthesis of Loop-free Programs", PLDI'11, (2011), 12 pages.

Franklin, L., et al., "LAMBDAFICTATOR: From Imperative to Functional Programming through Automated Refactoring", ICSE'13, (2013), pp. 1287-1290.

Dig, D., et al., "ReLooper: Refactoring for Loop Parallelism in Java", OOPSLA'09, (2009), 2 pages.

Kessler, Christoph; "Multi-Level Intermediate Representations", TDDC86 Compiler Optimizations and Code Generation, Linkopings University, 2009, pp. 1-19.

Rus et al.; "Scalable Array SSA and Array Data Flow Analysis", Proceedings of the 18th International Conference on, LCPC'05, Oct. 20-22, 2005, Hawthorne, NY, USA, vol. 4339, (Springer 2005), pp. 397-412.

* cited by examiner

```
1  Map<String,Integer> wordCount(List<String> docs) {
2      Map<String,Integer> m = new HashMap<>();
3      for (int i = 0; i < docs.size(); i++) {
4          // simplified word split for clarity
5          String[] split = docs.get(i).splitString(" ");
6          for (int j = 0; j < split.length; j++) {
7              String w = split[j];
8              Integer prev = m.get(w);
9              if (prev == null) prev = 0;
10             m.put(w, prev + 1);
11         }
12     }
13     return m;
14 }
```

(data structures)

M[$A$] : bag (multiset) with values of type $A$

M[$K, V$] : map with keys of type $K$ and values of type $V$

M[$K, V$] is an M[$\langle K, V \rangle$]

(higher order functions)

fold : $B \rightarrow (\langle B, A \rangle \rightarrow B) \rightarrow (M[A] \rightarrow B)$ map: $(A \rightarrow B) \rightarrow (M[A] \rightarrow M[B])$ map: $(\langle K, V \rangle \rightarrow W) \rightarrow (M[K, V] \rightarrow M[K, W])$ groupBy: $(A \rightarrow K) \rightarrow (M[A] \rightarrow M[K, M[A]])$ (functions and operations)

zip : $\langle M[K, A], M[K, B] \rangle \rightarrow M[K, \langle A, B \rangle]$ zip : $\langle M[A], M[B] \rangle \rightarrow M[\langle A, B \rangle]$ zip : $\langle M[K], M[K, B] \rangle \rightarrow M[K, B]$ ++: $\langle M[K, A], M[K, A] \rangle \rightarrow M[K, A]$ addition with replacement of matching keys $\oplus$ $\boxplus$    monoid plus operators $\oplus$ : $\langle M[K, A], M[K, A] \rangle \rightarrow M[K, A]$ $a \oplus b = ($ map $\lambda k \langle x\, y \rangle . x \boxplus y)(a$ zip $b)$

FIG. 5

$L(x = E \prec R) \rightarrow \text{let } x = L(E) \text{ in } L(R)$ $L(a[x := y]) \rightarrow a[x := y]$ $L(\text{return } x) \rightarrow x$ $L(\text{branch instruction} \prec R) \rightarrow L(R)$ (handled when reaching its $\phi$)

$$L\left(\begin{array}{l} \text{for } i = \phi(i', i''), \\ r_1 = \phi(r_1', r_1''), \ldots, r_n = \phi(r_n', r_n'') \\ i < l \\ \{E\} \prec R \end{array}\right) \rightarrow L\left(\begin{array}{l} \text{let } f = \lambda\, r_1\, r_2 \ldots i\, .\, L(E \prec \langle r_1'', \ldots, r_n'' \rangle) \text{ in} \\ \text{let } r = \text{fold}\langle r_1', \ldots, r_n' \rangle f\, \text{Range}(i', l) \text{ in} \\ \text{let } r_1, \ldots, r_n = r \text{ in } L(R) \end{array}\right)$$

$$L\left(\begin{array}{l} x = \phi(x_0, x_1) \\ \text{generated by the if} \\ \text{with branch coindition } C \end{array} \prec R\right) \rightarrow \text{let } x = \text{if } C \text{ then } x_0 \text{ else } x_1 \text{ in } L(R)$$

$L(\ldots) \rightarrow \ldots$

FIG. 6

| | |
|---|---|
| $E$ | letters in uppercase are pattern variables |
| $x$ | letters in lowercase are program variables or patterns matching program variables |
| $E_1 \subset E_2$ | $E_1$ is a subexpression of $E_2$ |
| free($E$) | is the set of free variables in $E$ |
| $x \in E$ | is shorthand for $x \in$ free($E$) |
| $E[E_1/E_0]$ | substitute $E_1$ for $E_0$ in $E$ |
| $K$ | is only used for denoting pattern matches on the parameters binding to the keys of the operator domain |

FIG. 7

(extractmapfromfold)

$$\frac{\text{fold } \langle r_0^0, \ldots, r_n^0 \rangle \lambda \langle r_0, \ldots, r_n \rangle K\, V\, .\, E}{(\text{fold } \langle r_0^0, \ldots, r_n^0 \rangle \lambda \langle r_0, \ldots, r_n \rangle K\, \langle v_0^f, \ldots, v_m^f \rangle V_{\cap \text{free}(F)}\, .\, F)}$$
$$\circ (\text{map } \lambda K\, V\, .\, \langle G[r^0/r\_], V_{\cap \text{free}(F)} \rangle)$$

$E = (\lambda \langle v_0^f, \ldots, v_m^f \rangle\, .\, F) \circ G$ $F$ is $\arg\max C(G)$ with the condition:

$\nexists i \in [0..n]\, .\, r_i \in G \wedge r_i \in E[r^0/r\_]$ where $r^0/r\_ = r_i^0[k]/r_i[k]$ applied for all $i \in [1..n]\, k \in K$ (fold to group by)

$$\frac{\text{fold } r_0 \lambda\, r\, V\, .\, r[E := B]}{(\text{map } \lambda k[k] \lambda g\, V\, .\, C)\, l)}$$
$$\circ (\text{groupBy } \lambda\, V\, .\, E\,)$$

$C = B[g/r[E]]$ $r \notin C \wedge r \notin E \wedge \exists\, v \in V.\, v \in E$ we cannot prove E is distinct across the folding

FIG. 8

(localize-map-accesses)

$$\frac{\text{map } \lambda\, KV\,.\,E}{\lambda\, a.((\text{map } \lambda\, K\, V\, v\,.\,E\ [v/c[i]]) \circ (\text{zip } a\, c))}$$

$c \in \{c \subset E \mid$
$(\exists! i \in K.c[i] \subset E) \wedge$
$(\text{free}(c) \backslash \text{free}(E) = \emptyset) \wedge$
$(\not\exists v \in K \cup V\,.\,v \in c)\}$ (localize-group-by-accesses)

$$\frac{\text{groupBy}(\lambda\, k\,.\,E)\ D}{\text{groupBy}(\lambda\, kv\,.\,E\ [v/c[k]])c}$$

$D$ is the domain (set of keys) of the $c$ Map

FIG. 9

(eliminate null check)

$$\frac{\text{if } a[k] == \text{null then } 0\ \text{else } a[k]}{a[k]}$$

$a$ is a monoid with $0$ as identity (identify map monoid plus)

$$\frac{\text{map}(\lambda\, i\, x\, y\,.\,x \oplus y)\ (\text{zip } A\ B)}{A \boxplus B}$$

A and B are monoids of the same type M[$T$]
$\oplus$ is the plus for $T$
$\boxplus$ is the plus for M[$T$]
also works for zip($B\ A$)

(swap map and fold)

$$\frac{(\text{fold } r_0 \oplus)\quad (\text{map } f)}{\lambda\, c\,.(r_0 \oplus f(\text{fold } 0\ \boxplus)\ c))}$$

mapover monoid $\boxplus$, $0$
$\forall ab.f(a \boxplus b) = f(a) \oplus f(b)$

FIG. 10

$$\frac{(\text{map } \lambda k_2 v_2 . E_2) \ (\text{map } \lambda k_1 v_1 . E_1)}{\text{map } \lambda k_1, v_1 . E_2[k_1/k_2][E_1/v_2]} \quad (\text{map fusion})$$

$$\frac{\text{fold } (r_0^0, \ldots, r_n^0) \ \lambda ((r_0, \ldots, r_n)(V) . (E_0, \ldots, E_n))}{\lambda c . ((\text{fold } r_0^0 \lambda r_0 V . E_0) \ c, \ldots, (\text{fold } r_n^0 \lambda r_n V . E_n)c)} \quad \text{applied } \forall k \in 0 \ldots n \quad (\text{fold vertical fission})$$
$$\forall k' \neq k . r_{k'} \notin E_k$$

$$\frac{(\text{map } \lambda \ KV \ . E) \quad (\text{zip } C_0 \ldots C_n)}{(\text{map } \lambda \ KV \ [z/v] \ . E \ [z/F]) \circ (\text{zip } C_0 \ldots (\text{map } \lambda \ k \ v . F \ C_k) \ldots C_n)} \quad (\text{map vertical fission})$$
$$F . G = \underset{E = F \circ G \wedge \text{cond}}{\arg\max} \ C(F)$$
$$\text{cond: } (\exists! k . C_k \in F) \wedge v \in V \text{ goes over } C_k \wedge$$
$$\forall v' \in V . v \neq v' \Rightarrow v' \notin C_k$$

$$\frac{\text{map } K \ V \ . B}{(\text{map } \lambda \ K \ (\text{free}(F) \cap V)(\text{free}(G) \setminus \text{free}(B)) \ . F) \circ (\text{map } \lambda \ KV \ . G)} \quad (\text{map horizontal fission})$$
$$F, G = \underset{B = F \circ G}{\arg\max} C(F)$$
$$F \text{ is not trivial}$$

FIG. 11

(eliminate empty fold)
$$\frac{\text{fold } r_0(\lambda rKV\,.\,r\,[K:=V])d}{r_0\mathbin{+\!\!+} d}$$

(eliminate empty map)
$$\frac{\text{map}(\lambda rV\,.\,V)d}{d}$$

(fold→size)
$$\frac{\text{fold } r_0\,\lambda r\,1\,.\,r+E}{\lambda x.E^*\,(\text{size } x)+r_0} \quad i \in 1.i \notin E$$

(transpose of transpose)
$$\frac{(\text{t}\circ\text{t})\,a}{a}$$

(factor out store)
$$\frac{\text{fold } r'\,\lambda r i.r\,[E:=B]}{r'[E:=\text{fold } r'[E]\lambda k.B\,[k/r[E]]]}$$

(apply store)
$$\frac{r[I:=E_0][I:=E_1]}{r[I:=E_1[E0/(r[I:=E_0][I])]]} \quad i \notin E \wedge r \notin E$$

FIG. 12

$$\frac{(\text{map } \lambda K \langle v_0, \ldots, v_n \rangle . E)(\text{zip } C_0 \ldots C_n)}{(\text{map } \lambda K \langle v_0, \ldots, v'_k, \ldots, v_n \rangle . E[v'_k/v_k[J]])(\text{zip } C_0 \ldots (t(C_k))[J] \ldots C_n)} \quad \begin{array}{l} (\text{transpose zipped}) \\ k \in 1 \ldots n \\ \exists J . v_k[J] \subset E \\ \nexists v \in K \cup \{v_0, \ldots v_n\} . v \in J \end{array}$$

$$\frac{\text{fold } r^0 \, \lambda r \, k \, V \, . \, r[\langle c, k \rangle := E]}{\text{fold } (r^0[c]) \, \lambda r' \, k \, V \, : \, r'[k := E[r'[k]/r[\langle c, k \rangle]]]} \quad \begin{array}{l} (\text{lower-dimension-for-update}) \\ c \text{ is loop invariant} \\ \text{all accesses to } r \text{ in } E \text{ are } r[\langle c, k \rangle] \end{array}$$

$$\frac{\text{fold } r^0 \, \lambda r \, k \, V \, . \, r[\langle k, c \rangle := E]}{\text{fold } (t(r^0)[c]) \, \lambda r' \, k \, V \, . \, r'[k := E[r'[k]/r[\langle k, c \rangle]]]} \quad \begin{array}{l} c \text{ is loop invariant} \\ \text{all accesses to } r \text{ in } E \text{ are } r[\langle k, c \rangle] \end{array}$$

FIG. 13

Table 1. Evaluation programs and results

| Algorithm | # loop nests | # loops | Translation time (s) | fold/fold∘map | fold/groupBy | Localization | Optimization & Enabling | Monoid | Total |
|---|---|---|---|---|---|---|---|---|---|
| WorldCount | 1 | 1 | 8 | 1 | 1 | 3 | 7 | 5 | 17 |
| Histogram | 1 | 1 | 233 | 0 | 3 | 1 | 11 | 3 | 18 |
| Linear Regression | 1 | 1 | 28 | 1 | 0 | 1 | 0 | 0 | 2 |
| String Match | 1 | 1 | 68 | 1 | 0 | 1 | 0 | 0 | 2 |
| Matrix Product | 1 | 3 | 40 | 4 | 0 | 2 | 14 | 0 | 20 |
| PCA | 2 | 5 | 66 | 10 | 0 | 1 | 4 | 0 | 15 |
| KMeans | 2 | 6 | 340 | 5 | 0 | 1 | 4 | 0 | 10 |

FIG. 14

A. WordCount

```
for (int i = 0; i < docs.length; i++) {
  String[] split = docs[i].split(" ");
  for (int j = 0; j < split.length; j++) {
    String word = split[j];
    Integer prev = m.get(word);
    if (prev == null) prev = 0;
    m.put(word, prev + 1);
  }
}
```

⇓ Java to Lambda

```
Range(0, docs.size).fold(m)({
  case (v34,i) =>
    val split = docs(i).splitString(" ");
    val v10 = split.size;
    Range(0, v10).fold(v34)({
      case(v33,j) =>
        val v13 = v33(split(j));
        val prev = { if (v13 != null) v13 else
        0 };
        v33.updated(split(j), prev + 1)
    })
})
```

⇓ E:fold-to-group-by

```
Range(0, docs.size).fold(m)({
  case (v34, i) =>
    val v6 = docs(i).splitString(" ");
    val v4 = Range(0, v6.size).groupBy({
      case (j) =>
        v6(j)
    });
    val v5 = v4.mapM({
      case (v2, v3) =>
        v3.fold(v34(v2))({
          case (v1, j) =>
            { if (v1 != null) v1 else 0 } + 1
        })
    });
    v34 ++ v5
})
```

⇓ S:eliminate-null-check

```
Range(0, docs.size).fold(m)({
  case (v34, i) =>
    val v7 = docs(i).splitString(" ");
    val v4 = Range(0, v7.size).groupBy({
      case (j) =>
        v7(j)
    });
    val v5 = v4.mapM({
      case (v2, v3) =>
        v3.fold(v34(v2))({
          case (v1, j) =>
            v1 + 1
        })
    });
    v34 ++ v5
})
```

⇓ S:fold-to-size

```
Range(0, docs.size).fold(m)({
  case (v34, i) =>
    val v8 = docs(i).splitString(" ");
    val v4 = Range(0, v8.size).groupBy({
      case (j) =>
        v8(j)
    });
    val v5 = v4.mapM({
      case (v2, v3) =>
        v34(v2) + v3.size
    });
    v34 ++ v5
})
```

FIG. 15A

⇓ E:localize-map-accesses

```
Range(0, docs.size).fold(m)({
  case (v34, i) =>
    val v10 = docs(i).splitString(" ");
    v34 ++ Range(0, v10.size).groupBy({
      case (j) =>
        v10(j)
    }).zip(v34).mapM({
      case (v2, (v3, v9)) =>
        v9 + v3.size
    })
})
```

⇓ S:reduce-monoid-identity-op

```
Range(0, docs.size).fold(m)({
  case (v34, i) =>
    val v11 = docs(i).splitString(" ");
    v34 ++ Range(0, v11.size).groupBy({
      case (j) =>
        v11(j)
    }).zip(v34).mapM({
      case (v2, (v3, v9)) =>
        v9 + v3.size
    })
})
```

⇓ E:map-vertical-fission

```
Range(0, docs.size).fold(m)({
  case (v34, i) =>
    val v13 = docs(i).splitString(" ");
    v34 ++ Range(0, v13.size).groupBy({
      case (j) =>
        v13(j)
    }).mapM({
      case (v2, v3) =>
        v3.size
    }).zip(v34).mapM({
      case (v2, (v12, v9)) =>
        v9 + v12
    })
})
```

⇓ E:pull-map-from-fold-by-subexpression-extract

```
Range(0, docs.size).mapM({
  case (i) =>
    val v15 = docs(i).splitString(" ");
    Range(0, v15.size).groupBy({
      case (j) =>
        v15(j)
    }).mapM({
      case (v2, v3) =>
        v3.size
    })
}).fold(m)({
  case (v34, (i, v14)) =>
    v34 ++ v14.zip(v34).mapM({
      case (v2, (v12, v9)) =>
        v9 + v12
    })
})
```

⇓ E:identify-map-monoid-plus

```
Range(0, docs.size).mapM({
  case (i) =>
    val v16 = docs(i).splitString(" ");
    Range(0, v16.size).groupBy({
      case (j) =>
        v16(j)
    }).mapM({
      case (v2, v3) =>
        v3.size
    })
}).fold(m)({
  case (v34, (i, v14)) =>
    v14 |+| v34
})
```

⇓ E:localize-group-by-accesses

```
Range(0, docs.size).mapM({
    case (i) =>
        (docs(i).splitString(" ").groupBy(ID).__2).mapM({
            case (v2, v3) =>
                v3.size
        })
}).fold(m)({
    case (v34, (i, v14)) =>
        v14 |+| v34
})
```

⇓E:localize-map-accesses

```
docs.mapM({
    case (i, v18) =>
        (v18.splitString(" ").groupBy(ID).__2).mapM({
            case (v2, v3) =>
                v3.size
        })
}).fold(m)({
    case (v34, (i, v14)) =>
        v14 |+| v34
})
```

⇓E:map-horizontal-fission

```
docs.mapM({
    case (i, v18) =>
        v18.splitString(" ").groupBy(ID).__2
}).mapM({
    case (i, v19) =>
        v19.mapM({
            case (v2, v3) =>
                v3.size
        })
}).fold(m)({
    case (v34, (i, v14)) =>
        v14 |+| v34
})
```

⇓E:swap-map-with-fold

```
val v19 = docs.mapM({
    case (i, v18) =>
        v18.splitString(" ").groupBy(ID).__2
}).fold(Map())({
    case (v20, (i, v21)) =>
        v20 |+| v21
});
v19.mapM({
    case (v2, v3) =>
        v3.size
})
```

⇓E:map-horizontal-fission

```
docs.mapM({
    case (i, v18) =>
        v18.splitString(" ").groupBy(ID)
}).mapM({
    case (i, v22) =>
        v22.__2
}).fold(Map())({
    case (v20, (i, v21)) =>
        v20 |+| v21
}).mapM({
    case (v2, v3) =>
        v3.size
})
```

⇓E:map-horizontal-fission

```
docs.mapM({
    case (i, v18) =>
        v18.splitString(" ")
}).mapM({
    case (i, v23) =>
        v23.groupBy(ID)
}).mapM({
    case (i, v22) =>
        v22.__2
}).fold(Map())({
```

```
    case (v20, (i, v21)) =>
        v20 |+| v21
}).mapM({
    case (v2, v3) =>
        v3.size
})
```

⇓E:swap-map-with-fold

```
{
    val v22 = docs.mapM({
        case (i, v18) =>
            v18.splitString(" ")
    }).mapM({
        case (i, v23) =>
            v23.groupBy(ID)
    }).fold(Map())({
        case (v24, (i, v25)) =>
            v24 |+| v25
    });
    v22.__2
}.mapM({
    case (v2, v3) =>
        v3.size
})
```

⇓E:swap-map-with-fold

```
({
    val v23 = docs.mapM({
        case (i, v18) =>
            v18.splitString(" ")
    }).fold(Map())({
        case (v26, (i, v27)) =>
            v26 |+| v27
    });
    v23.groupBy(ID)
}.__2).mapM({
    case (v2, v3) =>
        v3.size
})
```

⇓E:swap-map-with-fold

```
val v18 = docs.mapM({
    case (i, v13) =>
        v13.splitString(" ")
}).fold(Map())({
    case (v23, (i, v24)) =>
        v23 |+| v24
});
val v17 = v18.groupBy(ID);
(v17.__2).mapM({
    case (v2, v3) =>
        v3.size
})
```

FIG. 15B

$$C(F \circ G) = C(F) + C(G)$$
$$C(F(G)) = C(F) + C(G)$$
$$C(\langle F, G, ...\rangle) = C(F) + C(G) + ...$$
$$C(A[I]) = C_{get}^{collection} + C(A) + C(I)$$
$$C(A[K:=V]) = C_{set}^{collection} + C(A) + C(K) + C(V)$$
$$C(\text{map } F) = C_{init}^{map} + C_{op}^{map} * C(F)$$
$$C(\text{fold } I\ F) = C(I) + C_{init}^{fold} + C_{op}^{fold} * C(F)$$

FIG. 16

AUTOMATIC CONVERSION OF SEQUENTIAL ARRAY-BASED PROGRAMS TO PARALLEL MAP-REDUCE PROGRAMS

BACKGROUND

Over the past decade, the MapReduce programming model has gained traction both in research and in practice. Mainstream MapReduce frameworks [Apache Hadoop; J. Dean and S. Ghemawat, Mapreduce: Simplified data processing on large clusters. OSDI'04, 2004] provide significant advantages for large-scale distributed parallel computation. In particular, MapReduce frameworks can transparently support fault-tolerance, elastic scaling, and integration with a distributed file system.

Additionally, MapReduce has attracted interest as a parallel programming model, independent of difficulties of distributed computation [C. Ranger, R. Raghuraman, A. Penmetsa, G. Bradski, and C. Kozyrakis. Evaluating MapReduce for multi-core and multiprocessor systems. HPCA '07, pp. 13-24, 2007]. MapReduce has been shown to be expressive enough to express important parallel algorithms in a number of domains, while still abstracting away low-level details of parallel communication and coordination.

SUMMARY

The present disclosure relates generally to the field of automatic conversion of sequential array-based programs to parallel MapReduce programs. In one example, "array-based" refers in general to collections. In another example, "array-based" includes maps. In another example, "array-based" includes lists. In various other examples, automatic conversion of sequential array-based programs to parallel MapReduce programs may be implemented in the form of systems, methods and/or algorithms.

In one embodiment, the present disclosure relates to an approach for automatic translation of sequential, imperative code into a parallel MapReduce framework. Automating such a translation is challenging: imperative updates must be translated into a functional MapReduce form in a manner that both preserves semantics and enables parallelism. One embodiment works by first translating the input code into a functional representation, with loops succinctly represented by fold operations. Then, guided by rewrite rules, the approach searches a space of equivalent programs for an effective MapReduce implementation. The rules include a novel technique for handling irregular loop-carried dependencies using group-by operations to enable greater parallelism. One example of the technique has been implemented in a tool called MOLD. MOLD translates sequential Java code into code targeting the Apache Spark runtime. MOLD was evaluated on several real-world kernels and it was found that in most cases MOLD generated the desired MapReduce program, even for codes with complex indirect updates In one embodiment, a method for automatic conversion of a sequential array-based program to a parallel program is provided, the method comprising: obtaining, by a processor, an Array SSA representation of the sequential array-based program; transforming, by the processor, the Array SSA representation into a Lambda Calculus representation that includes a construct for representing loops; and replacing, by the processor, the loop construct with a plurality of operators to generate an executable parallel program.

In another embodiment, a computer program product for automatic conversion of a sequential array-based program to a parallel program is provided, the program code of the computer program product executable by at least one computer to perform a method comprising: obtaining an Array SSA representation of the sequential array-based program; transforming the Array SSA representation into a Lambda Calculus representation that includes a construct for representing loops; and replacing the loop construct with a plurality of operators to generate an executable parallel program.

In another embodiment, a computer-implemented system for automatic conversion of a sequential array-based program to a parallel program is provided, the system comprising: an obtaining element configured to obtain an Array SSA representation of the sequential array-based program; a transforming element configured to transform the Array SSA representation into a Lambda Calculus representation that includes a construct for representing loops; and a replacing element configured to replace the loop construct with a plurality of operators to generate an executable parallel program.

BRIEF DESCRIPTION OF THE DRAWINGS

Various objects, features and advantages of the present invention will become apparent to one skilled in the art, in view of the following detailed description taken in combination with the attached drawings, in which:

FIG. 5 depicts an example of built-in data structures and operators.

FIG. 6 depicts an example array SSA to Lambda Calculus with fold.

FIG. 7 depicts a legend for certain of the following figures.

FIG. 8 depicts rules revealing parallelism in fold operators according to an embodiment of the present invention.

FIG. 9 depicts rules for localized access according to an embodiment of the present invention.

FIG. 10 depicts monoid-based rules according to an embodiment of the present invention.

FIG. 11 depicts fusion-fission rules for merging and splitting map and fold operators according to an embodiment of the present invention.

FIG. 12 depicts simplifying and enabling transformations rules used by MOLD according to an embodiment of the present invention.

FIG. 13 depicts code motion rules for arrays and collections with multiple dimensions according to an embodiment of the present invention.

FIG. 14 depicts Table 1, related to evaluation programs and results according to an embodiment of the present invention.

FIGS. 15A and 15B list example transformation steps taken by the tool according to an embodiment of the present invention to reach various solutions discussed herein (FIG. 15A is the first part of the transformation steps and FIG. 15B is the second part of the transformation steps).

FIG. 16 depicts cost estimation according to an embodiment of the present invention.

DETAILED DESCRIPTION

As described herein, addressed is the challenge of automatically translating sequential imperative code into a parallel MapReduce framework. An effective translation tool could greatly reduce costs when re-targeting legacy sequential code for MapReduce. Furthermore, a translator could simplify the process of targeting MapReduce in new programs: a developer could concentrate on sequential code, letting the translator handle parallel computation using MapReduce.

Translating an imperative loop to the MapReduce model inherits many of the difficulties faced by parallelizing compilers, such as proving loops free of loop-carried dependencies. However, the MapReduce framework differs substantially from a shared-memory parallel loop execution model. Notably, MapReduce implies a distributed memory programming model: each mapper and reducer can operate only on data which is "local" to that function. So, an automatic translator must at least partition memory accesses in order to create local mapper and reducer functions which do not rely on shared memory.

Additionally, the communication model in MapReduce is more limited than traditional distributed memory parallel programming with message-passing. Instead, mappers and reducers communicate via a shuffle operation, which routes mapper outputs to reducer inputs based on key fields in the data. These restrictions allow practical MapReduce frameworks to run relatively efficiently at large scale; however, they also introduce constraints on the programmer and challenges for an automatic translator.

Figures 1, 2:
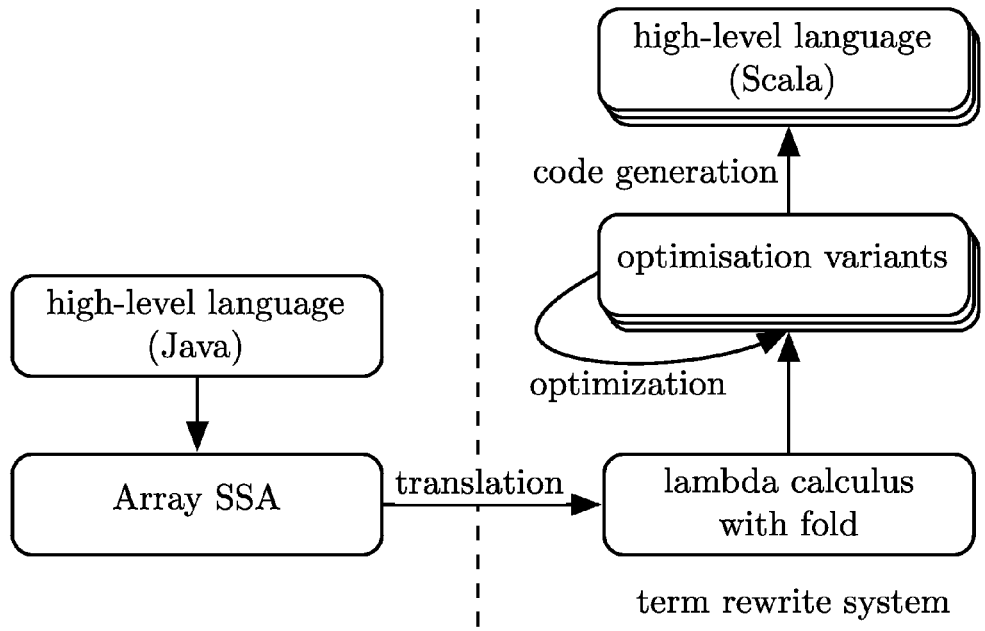
FIG. 1 depicts a block diagram of an overview of a translation system according to an embodiment of the present invention.
FIG. 2 depicts an example Java word count program.

FIG. 1 illustrates the design of a translator according to an embodiment of the invention. An input program is first translated into Array SSA form [K. Knobe and V. Sarkar. Array SSA form and its use in parallelization. POPL '98, pp. 107-120, 1998] which facilitates the derivation into an lambda-calculus-style functional representation. In contrast with Appel's and Kelsey's work on converting from SSA to functional code [A. W. Appel. SSA is functional programming. SIGPLAN Not., 33(4):17-20, April 1998; R. A. Kelsey. A correspondence between continuation passing style and static single assignment form. IR '95, pp. 13-22, 1995.], this translation uses a fold operator to maintain the structure of loops, which is essential for later transformations.

The initial "lambda plus fold" representation of a program is still far from an effective MapReduce program. While fold operations could be implemented using reducers, the lack of mappers hinders parallelism, and the code still operates on shared data structures. To address these problems, a rewriting system is employed to generate a large space of MapReduce programs. The rewrite rules govern where mapper constructs can be introduced in a semantics-preserving manner. Critically, in more complex cases where loop iterations access overlapping locations, the MapReduce shuffle feature is exploited to group operations by accessed locations, exposing much more fine-grained parallelism than previous approaches. Given the rewriting rules, this embodiment performs a heuristic search to discover a final output program, using a customizable cost function to rank programs.

As mentioned above, various techniques disclosed herein have been implemented in a tool named MOLD, which transforms input Java programs into Scala programs that can be executed either on a single computing node via parallel Scala collections, or in a distributed manner using Spark, a popular MapReduce framework [Apache Spark; M. Zaharia, M. Chowdhury, M. J. Franklin, S. Shenker, and I. Stoica. Spark: Cluster computing with working sets. Hot-Cloud'10, pp. 10-10, 2010]. MOLD leverages the WALA analysis framework [T. J. Watson Libraries for Analysis] to generate Array SSA and implements a custom rewriting engine using the Kiama [A. M. Sloane. Lightweight language processing in Kiama. GTTSE III, pp. 408-425. Springer, 2011] library. In an experimental evaluation, MOLD was tested on a number of input kernels taken from real-world Java and MapReduce benchmarks. In most cases, MOLD successfully generated the desired MapReduce code, even for codes with complex indirect array accesses that cannot be handled by previous techniques. MOLD is believed to be the first system that can automatically translate sequential implementations of canonical MapReduce programs like "word count" (discussed below) into effective MapReduce programs.

Certain MapReduce details as presented by Dean and Ghemawat [J. Dean and S. Ghemawat. Mapreduce: Simplified data processing on large clusters. OSDI'04, 200] will now be presented.

With respect to this MapReduce background, it is noted that the programmer defines a map function and a reduce function. The functions have the following types:

$$\text{map: } (k1, v1) \rightarrow \text{List}[k2, v2]$$

$$\text{reduce: } (k2, \text{List}[v2]) \rightarrow \text{List}[v2]$$

The MapReduce framework relies on a built-in, implicit shuffle function to route the output of the mappers to the input of the reducers. Logically, the shuffle function performs a group-by operation over the map outputs. That is, for each distinct key k of type k2 output by a mapper function, the shuffle function collects all the values of type v2 associated with k, forms a list/of these values, and sends the resulting pair (k; 1) to a reducer.

Dean and Ghemawat present wordcount as an example to define mappers and reducers. In their wordcount example, the map function takes as input a document name and a String which holds the document contents. For each word w in the contents, the mapper emits a pair (w; 1). The shuffle operation will create a list of the form [1, 1 ..., 1] for each word w, grouping the map output values (all ones) by word. Then the reducers simply sum up the number of ones present in the list associated with each word. The resulting sums represent the frequency count for each word.

The built-in shuffle or group-by operation plays a central role, for at least two reasons. Firstly, the shuffle operation encapsulates all communication between nodes. In traditional distributed memory parallel computing models, the programmer must explicitly pass messages or manage remote memory access in order to express communication. Instead, in MapReduce, the programmer simply defines functions which produce and consume tuples, and the framework transparently implements the necessary communication. MapReduce cannot express every possible parallel algorithm and communication pattern—but when MapReduce does apply, it relieves the programmer from the burden of managing communication explicitly, resulting in much simpler parallel programming. Secondly, it is noted that the shuffle operation can be extremely expensive, and can limit performance in many use cases if not managed carefully. Naïve use of MapReduce can result in all-to-all communication patterns whose overhead can overwhelm any speedups from parallel computation.

In the remainder of this disclosure, the focus is on MapReduce primarily as a convenient model for expressing parallel computation. In particular, the challenge of automatically translating sequential code into a MapReduce parallel programming model is considered. Not addressed are issues specific to large-scale distributed MapReduce deployments, such as fault-tolerance, elasticity, and distributed file systems.

With respect now to an overview of the approach according to the present embodiment, consider the challenge of automatically generating effective MapReduce code for wordcount. FIG. 2 shows the sequential Java code, the starting point. The program iterates through a list of documents docs, accumulating the word counts into the m map.

Parallelizing the FIG. 2 example is difficult because of the updates to the shared m map in different loop iterations—naïvely running loop iterations in parallel would cause a race conditions on m if two iterations try to simultaneously update a word's count. Some parallelism might be achieved by splitting the does list of documents into chunks, and computing word counts for each chunk simultaneously.

However, this transformation still leaves the sequential work of combining the word counts from the different chunks into final, global word counts. In contrast, the standard MapReduce word count program, which MOLD can generate, enables parallel accumulation of final word counts, by assigning the accumulation task for different ranges of words to different reducers.

Figures 3, 4:
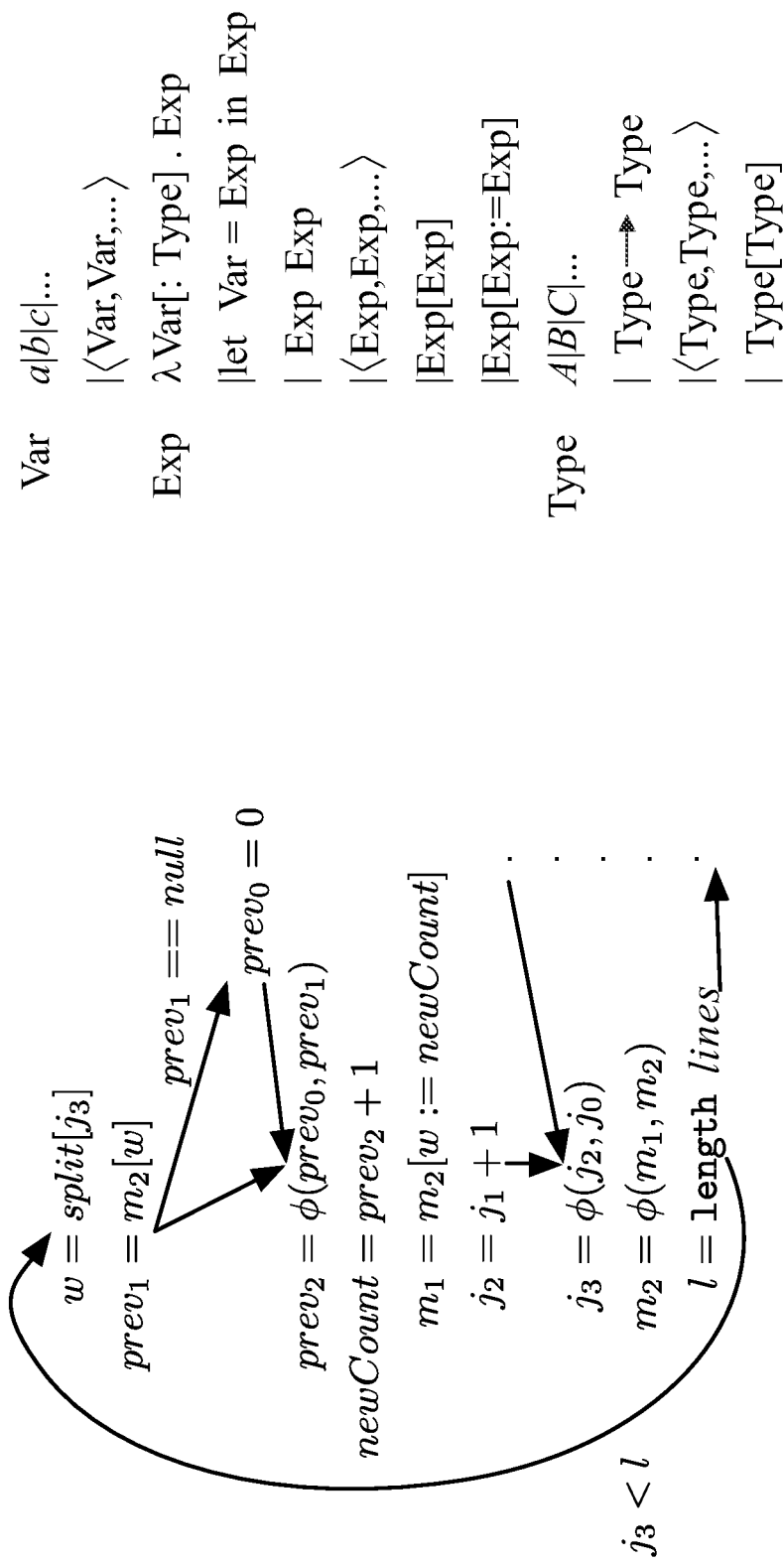
FIG. 3 depicts an array SSA form for the inner loop of FIG. 2.
FIG. 4 depicts an example Lambda Calculus IR.

First consider generating a MapReduce program for the inner loop of FIG. 2 (lines 6-11), which computes word counts for an array of words split. The first step of the technique is to translate the input program into a functional representation via Array SSA form [K. Knobe and V. Sarkar. Array SSA form and its use in parallelization. POPL '98, pp. 107-120, 1998]. FIG. 3 gives the Array SSA form for the inner loop. Note that here, the m map is the "array" being updated by the loop. The implementation treats Java arrays, Lists, and Maps in a unified manner as mappings from keys to values. This form can be seen as functional if every write to a location of m is treated as creating a new copy of the map with a new value for the appropriate word.

After constructing Array SSA form, MOLD translates the program to a more explicitly functional form. Unlike previous translations from SSA to functional code [A. W. Appel. SSA is functional programming. SIGPLAN Not., 33(4):17-20, April 1998; R. A. Kelsey. A correspondence between continuation passing style and static single assignment form. IR '95, pp. 13-22, 1995.], the technique preserves the structure of loops by translating them using the standard fold operation from functional programming. MOLD transforms each non-ϕ SSA assignment into a let statement. E.g., w=split [$j_3$] is transformed to let w=split [$j_3$] in . . . .

Each loop (branching and ϕ instructions) is transformed into a fold going over the domain of the initial loop, with its combining operation taking the tuple of ϕ values as one argument and the loop's index as the other, and returning a new tuple of values. In this example, the fold goes over the range of integers from 0 to the length of the split array, with a combining operation that takes as arguments $m_2$ and $j_3$ and returns $m_1$, i.e., the in-loop branch of ϕ ($m_1$, $m_2$).

Each remaining ϕ value with its corresponding branch instruction is rewritten into a predicated if assignment. E.g. ϕ ($prev_0$, $prev_1$) with the corresponding branch condition $prev_1$==null is transformed to:
if prev1==null then prev0 else prev1
Thus, the SSA-form code in FIG. 3 is converted to:

```
let updateCount = λm₂j₃.
  let w = split[ j3] in
    let prev1 = m2[w] in
      let prev2 = if prev1 == null then 0 else prev1 in
        let newCount = prev2 + 1 in
          let m1 = m2[w := newCount] in
            m1
in fold m0 updateCount (0...(length split))
```

Next, MOLD explores the space of possible optimizing transformations that can be applied to the code above. The transformations are expressed as rewrite rules and are detailed below. For now, the focus will be on the particular transformations that take the functional, yet sequential, code above and turn it into MapReduce form.

After inlining some of the let expressions and renaming variables for readability, we get to:

```
let updateCount = λmj .
  let w = split[j] in
    let prev = m[w] in
      m[w := (if prev == null then 0 else prev) +1]
in fold m updateCount (0...(length split))
```

One initial observation is that the fold traverses a range of integers instead of the split collection itself. Thus, MOLD transforms the code such that the fold traverses the collection without indirection:

```
let updateCount = λmw .
  let prev = m[w] in
    m[w := (if prev == null then 0 else prev) +1]
in fold m updateCount split
```

Next, MOLD identifies common update idioms and lifts them to more general functional operations. In this example, the m map is lifted to return zero for non-existent keys. Thus, the if condition returning either zero or the previous value in the map becomes unnecessary, and MOLD replaces it with just the map access. Thus, MOLD transforms the program to:

```
let updateCount = λ m w .m[w := m[w] + 1] in
  fold m updateCount split
```

The fold call takes the initial m map, the updateCount function, and the split String array, and computes a new map with updated word counts. The updateCount accumulator function takes a map m and a word w as arguments, and returns a new map that is identical to m except that the count for w is incremented.

The functional form above is semantically equivalent to the original imperative code, but unfortunately exposes no parallelism, since the fold operation is sequential. Furthermore, trying to parallelize the fold directly would not work as the accesses to the m collection do not follow a regular pattern, i.e. w may have any value, independent of the underlying induction variable of the loop.

A common way to parallelize such code is to take advantage of the commutativity of the updating operation and tile the fold, namely the loop [S.-w. Liao. Parallelizing user-defined and implicit reductions globally on multiprocessors. ACSAC'06, pp. 189-202, 2006]. While this solution does expose parallelism, it is coarse-grained, may not be applicable in the presence of indirect references, and does not match the MapReduce model of computation.

MOLD also generates this solution but, as it is not what is aimed for, it also explores a different parallelization avenue: instead of avoiding the non-linear w value, a program can inspect it [R. Das, M. Uysal, J. Saltz, and Y.-S. Hwang. Communication optimizations for irregular scientific computations on distributed memory architectures. Journal of Parallel and Distributed Computing, 22(3):462-478, September 1994. J. Dean and S. Ghemawat. Mapreduce:] to reveal parallelism. Parts of computation operating on distinct w values are independent so they can be executed in parallel. Thus, this example is also equivalent to:

```
let grouped = (groupBy id split) in
    map (λ k v . fold m[k](λy.x.y + 1)v)grouped
```

The inner fold is only computing the size of the v list of words, and adding it to the previous value in m. Assuming an initially empty map m, in the end, the rewrite system produces the following program as part of its output:

```
let grouped = (groupBy id split) in
    map (λ k v .v.size)grouped
```

The sequential fold operation has been completely eliminated. Instead, what is left is the equivalent of the canonical MapReduce implementation of word counting. The groupBy operation yields a map from each word to a list of copies of the word, one for each occurrence; this corresponds to the standard mapper. Then, the map operation takes the grouped data and outputs the final word count map, corresponding to the standard reducer (The value of the map operation is itself a map, with the same keys as the input map). Given a large number of documents spread across several servers, the groupBy task can be run on each server separately, and the map task in the reducer can also be parallelized across servers, given the standard "shuffle" operation to connect the mappers and reducers (The standard MapReduce implementation does not construct explicit lists with a groupBy, but instead sends individual word instances to the reducers using "shuffle." MOLD emits an equivalent program for its Spark backend).

Discussed above was the inner loop of the input Wordcount program. Discussed below is how this integrates with the fold for the outer loop, and how MOLD brings the entire program to a MapReduce form.

Finally, MOLD takes what it considers the best generated code versions and translates them to Scala. The best generated version, exactly as it is output by MOLD, is:

```
val v56 = docs.mapM({
    case (i, v40) => v40.splitString(" ")
}) .fold(Map( ))({
    case (v58, (i, v59)) => v58 |+| v59
    }) ;
val v46 = v56.groupBy (ID);
(v46._ _2) .mapM ({
    case (v2, v3) => v3.siz
})
```

The generated code's computation structure is similar to classic MapReduce solutions for the WordCount problem. The code above uses custom collection classes which implement interfaces that provide higher-order functional operators (e.g., mapM). The system provides two implementations of these operators, so the code can execute either using Scala concurrent collection classes or on the Spark MapReduce framework [M. Zaharia, M. Chowdhury, M. J. Franklin, S. Shenker, and I. Stoica. Spark: Cluster computing with working sets. Hot-Cloud'10, pp. 10-10, 2010].

Reference will now be made to generating functional IR. That is, described below are the initial stages of translation, which convert an input program into a functional intermediate representation via Array SSA form.

The standard SSA representation enables straightforward tracking of def-use relationships by ensuring each variable has a single static definition which reaches all uses. However, standard SSA does not reflect modification to the stack or heap, such as the effects of array writes. Array SSA form [K. Knobe and V. Sarkar. Array SSA form and its use in parallelization. POPL '98, pp. 107-120, 1998] extends traditional SSA form with constructs that represent modifications to array contents.

Array SSA form generates a new name for an array variable on each write. Any subsequent reads from the array use the new name, simplifying tracking of data flow though the array. In contrast to the original work on Array SSA, the techniques described herein treat arrays as being immutable data structures, as the techniques described herein aim to translate the program into a functional representation. Hence, each array write is modeled as creating a fresh array with a new SSA name. With this functional model, the Array SSA form is simplified compared to the previous work [K. Knobe and V. Sarkar. Array SSA form and its use in parallelization. POPL '98, pp. 107-120, 1998]; a φ statement is not required after each array write, and a special semantics is not required for φ statements over array variables.

MOLD generalizes the collections covered by Array SSA to include maps and lists. Thus, new SSA names are also introduced when putting an element into a map, or adding or putting an element into a list. This allows MOLD to treat arrays, lists, and maps in a unified manner as mappings from keys to values.

Note that in the techniques described herein, translation to Array SSA form does not account for aliasing of array variables introduced in unobserved code, e.g., via caller or callee functions. The implementation currently assumes that unobserved code does not introduce such aliasing.

Referring now to functional IR, it is noted that previous work by Appel [A. W. Appel. SSA is functional programming. SIGPLAN Not., 33(4):17-20, April 1998] and Kelsey [R. A. Kelsey. A correspondence between continuation passing style and static single assignment form. IR '95, pp. 13-22, 1995] observed that a program in SSA form is essentially a functional program. This observation can be extended in a straightforward manner to the Array SSA form described above, yielding a method for translating to a functional intermediate form. However, the aforementioned previous translation techniques are not suitable for the purposes described herein, as the aforementioned previous translation techniques do not preserve the structure of loops (which are translated to general recursive function calls). Transformation of loop computations is critical to introducing parallelism, so the techniques described herein rely on knowledge of loop structure. Here, a translation is given from Array SSA form to a functional IR that includes a built-in fold construct, used to preserve the structure of loops.

MOLD's intermediate representation, shown in FIG. 4, is a typed lambda calculus. For brevity, throughout the rest of the disclosure, types are omitted when they are clear from the context. The IR is enriched with a tuple constructor, e.g., $\langle e_1, e_2 \ldots \rangle$. Tuples behave like functions (e.g., $\langle f, g \rangle \langle a,b \rangle = \langle fa, gb \rangle$), and are unwrapped on application (e.g., $\lambda xy \cdot y \langle a, b \rangle = b$). A tuple notation is sometimes used in the parameter part of lambda expression for highlighting a particular grouping of the parameters, but it can be interpreted in a curried fashion, e.g., $\lambda \langle x,y \rangle z \cdot e = \lambda xz \cdot e$. The IR has let expressions which allow simple pattern-matching on tuples (e.g., let $\langle x_1, x_2 \rangle = \langle e_2, e_2 \rangle$ in $x_1 + x_2) \cdot a[b]$ and $a[b:=c]$ are read and write accesses at index b of map (array) a.

FIG. 5 shows the built-in data structures along with signatures for the functions and operations operating over them. These constructs are mostly well-known, and will be described as needed throughout the disclosure. The translation from Array SSA relies on left-fold, a higher-order function that takes an initial element (a zero) of type B and a combining operation $$B \to A \to B,$$

and returns a function which reduces the elements of a collection of A elements into a value of type B by applying the operation from left to right.

MOLD transforms Array SSA form to the functional IR by applying the rules in FIG. 6. The instructions in the CFG are visited in topological order. Strongly connected components are considered nodes in the order, and are visited in turn in topological order. The $\rangle$ operator in FIG. 6 is used to reflect this ordering: $s \triangleleft R$ matches a statement s followed by remaining statements R in the topological ordering.

First discussed are the non-loop rules, which are mostly straightforward. SSA assignments x=E are transformed to lets. Any branch instruction is skipped, left to be handled when reaching its associated φ. The return instruction is replaced with the returned variable, which eventually sits at the innermost level of the let nest.

An if statement in the original code corresponds a branching statement followed by a set of φ instructions in SSA form. MOLD transforms each of the φ instructions corresponding to an if into a functional if with the condition coming from the branching instruction, and the branches being the arguments of the φ instruction. As the instructions are visited in a topological order, the variables holding the result for each of the two branches are already available in scope. Computing the results for the if before the instruction is not an issue from a semantic perspective because in the representation there are no side effects and no recursion (except for structured fold recursion). Also, performance is not hurt as the two branches are inlined by the rewrite system in a latter step.

The more complex rule translates loops to applications of the fold operator. In FIG. 6, a loop is specified in terms of its φ variables, which include the index variable i and other variables $r_1, r_2, \ldots$ updated in the loop body. These variables characterize all possible effects of the loop visible to subsequent code. For each φ variable $r_k$, $r_k'$ is used to refer to the value coming from outside the loop, and $r_k''$ for the new value produced by the loop. The loop gets translated to a fold over the domain of values for the index variable, from i' to i in FIG. 6. The combining function takes as arguments the current $r_k$ values and loop index, runs the body of the loop E once for those values, and returns the new $r_k$ values. The initial value for the fold is a tuple of the $r_k'$ values coming from outside the loop. Any loop with a loop-invariant domain (i.e., the domain does not depend on the loop's φ functions) can be translated to a fold. The implementation described herein only handles domains over a range of numbers with stride 1.

All other SSA instructions (function calls, operations, etc.) are transformed to lambda calculus in the intuitive straightforward manner. Function calls are not inlined.

Reference will now be made to the translation system. The transformation described above generates a lambda calculus representation of the original program but it is still far from MapReduce form. The loops in the original program are now sequential folds that do not expose any parallelism. In order to get to MapReduce form, MOLD explores the space of semantically equivalent programs obtained by applying a set of program transformation rules.

MOLD distinguishes between refinement and exploration rewrite rules. Refinement rules make definite improvements to the input term, e.g., eliminating a redundant operation such as fold $r\lambda \langle r, \langle k,v \rangle \rangle \cdot r[k:=v]$. Exploration rules may either improve the original code or bring it to a form that allows other rules to apply, e.g., loop fission is not necessarily an optimization but may allow another rule to eliminate part of the original loop.

Exploration rules are treated as transitions between states, i.e., applying a transition rule generates a new state in the system. Refinement rules do not generate new states but are applied exhaustively to the output of an exploration rule. One transition in the rewrite system is comprised of one application of an exploration rule followed by a complete reduction using the set of refinement rules. The set of refinement rules can be seen as a separate confluent rewrite system.

With respect now to optimized exploration, MOLD's rewrite system implements optimization mechanisms which can be applied according to a number of policies, guided by estimates of code quality. The system is not confluent nor terminating—so, the rewrite engine explores the space of possible rewrites guided by a heuristic driven by a cost function. The optimization problem reduces to searching through this system for a good solution. The number of states is kept in check by having a single state represent all alpha-equivalent programs that have the same beta-reduced form.

MOLD searches through the state space guided by a cost approximation function over program variants (see FIG. 16 for details). The cost function approximates the runtime performance of the code on a particular platform. Thus, MOLD allows optimization for different platforms by adopting appropriate cost functions.

In particular, in one example, the cost estimation function for generating MapReduce programs is computed recursively over a given term. The cost of function composition/application and tuples is the sum of the cost of their subexpressions. The cost for collection accesses has an extra weight to encourage access localization. map and fold operators have an initial cost meant to model the start of a distributed operation, and have their operation multiplied by a constant as an approximation for the size of the array. The rough cost estimation function could be made more precise by applying techniques such as those proposed by Klonatos et al. [Y. Klonatos, A. Nötzli, A. Spielmann, C. Koch, and V.

Kuncak. Automatic synthesis of out-of-core algorithms. SIGMOD '13, pp. 133-144, 2013], but the current version has proved sufficient for optimizing the programs in the evaluation suite.

Reference will now be made to optimization rules. Presented now will be the main rules of MOLD's rewrite system. The rules are shown in a simplified form. The actual rules have additional complexity for updating types, for handing idiosyncrasies of the source and target languages, for piggy-backing arity information useful for code generation, and for optimizing the exploration. Furthermore, the actual rule set has additional variants and guards for correctly handling non-pure functions like random.

FIG. 7 summarizes the notation and functions used in the following Figures.

Reference will now be made to extract map from fold. The transformation for revealing parallelism which is most commonly applied is the "extract map from fold" rule in FIG. 8. It transforms a fold by identifying independent computations in its combining function $f$, i.e., operations that do not depend on results from other $f$ invocations during the fold. These independent computations are extracted into a (parallelizable) map operation. For example, fold 0λrkv·r+(fkv) is transformed to (fold 0λrk $v_f$·r+$v_f$)∘(map λ k v·fkv), as (fkv) is independent (map shall be explained shortly). After the transformation, the purely-functional map can be easily parallelized, while the fold with the commutative+operation can also be executed very efficiently.

The signatures for the data structures and mapping operators relevant to this transformation are shown in FIG. 5. Data structures are either a bag of values of type A, or indexed collections (e.g., arrays or maps) with key type K and value type V. An indexed collection is often viewed as a list of key-value pairs. The first map version takes a collection of elements of type A into a collection of elements of type B, as is standard. The second map version is similar but only applies to indexed collections; it generates a new indexed collection with the same keys as the original and the mapped values. It is assumed that a mapping function A→B is implicitly lifted to $\langle K,A \rangle$→B if necessary.

The "extract map from fold" rule, shown in FIG. 8, matches on any fold taking $\langle r_0^0, \ldots, r_n^0 \rangle$ as the initial value and a function combining each tuple of keys K and values V of a collection to a tuple $\langle r_0, \ldots, r_n \rangle$. The fold operation E is split into the composition of functions (λ$\langle v_0^f, \ldots, v_m^f \rangle$·F)∘G, such that G is the most expensive computation (according to the cost function C, discussed herein) that is independent of other "iterations" of the fold's execution. If the fold is seen as a loop, G does not have any loop carried-dependencies.

How is it reasoned that G is independent? For a functional fold operation, a dependence on other fold "iterations" must be manifest as an access of an accumulator parameter r, i.e., a parameter holding the "result thus far" of the fold. Hence, if G makes no reference to any parameter $r_i$, it is trivially independent. Unfortunately, this simple level of reasoning is insufficient for providing independence for important cases like the following:

$$\text{fold } r^0 \lambda r k \cdot r[k:=f(r[k])]$$

This fold updates each entry in a collection to some function of its previous value. We would like to extract the computation $f(r[k])$ into a parallel map operation, but it accesses accumulator parameter r and hence is not trivially independent.

To handle cases like the above, a more sophisticated independence check for G is used:

$$\not\exists i \in [0 \ldots n] \cdot r_i \in G \cdot r_i \in E[r\_^0/r\_]$$

As shown in FIG. 8, the $E[r\_^0/r\_]$ expression substitutes an access to the initial collection $r_i^0[k]$ for $r_i[k]$ in E, for all possible $r_i$ and k. (the reason for this particular substitution will be discussed shortly.) So, in essence, the formula ensures that for any $r_i \in G$, all appearances of $r_i$ in the enclosing expression E are of the form $r_i[k]$, i.e., they are accesses to a current key k. (Any non-conforming access like $r_i[k+1]$ will not be removed by the $r\_^0/r\_$ substitution.) Checking that all collection accesses in E use a current key ensures that G remains independent in spite of its access of the accumulator collection.

If a non-trivial (i.e., contains computation with a nonzero cost) G is found, it is pulled out into a map which is then composed with a fold executing F, the remaining computation in E. The signature of the fold's operation is adjusted to account for the change: $v_0^f, \ldots, v_m^f$, the variables linking G to F, are now parameters, and any previous parameters (V) which are still needed by F are propagated (i.e., V∩$_{free}$ (F)). As the extracted G no longer has access to the $r_i$ parameters, $G[r\_^0/r\_]$ is placed in the map instead, so its accesses are performed on the initial collection $r^0$.

The rule does not specify how E is decomposed. E is in many cases a tuple of expressions. The current implementation selects the subexpression with the largest cost for each expression in the tuple E. It uses a recursive function computing the largest subexpression considering name binding constraints and the cost function.

The "extract map from fold" rule rewrites the example above that updates all collection values to:

$$(\text{fold } r^0 \lambda r \langle k,v \rangle \cdot r[k:=v]) \circ (\text{map } \lambda k \cdot f(r_0[k]))$$

The "extract map from fold" transformation is somewhat analogous to parallelizing a loop with no loop-carried dependencies in imperative code. A key difference is that here, the functional IR is leveraged to extract and parallelize subcomputations of the fold without worrying about side effects; similar transformations for imperative loops would likely require greater sophistication.

Reference will now be made to fold to groupBy. While the "extract map from fold" rule exposes significant parallelism, it cannot handle cases where distinct loop iterations can update the same array/map location. MapReduce applications like wordcount mentioned earlier often work around such issues by using a shuffle operation to group inputs by some key and then process each group in parallel. Presented here is a "fold to groupBy" rule that enables the system to automatically introduce such shuffle operations where appropriate, dramatically increasing parallelism for cases like wordcount. No similar automatic transformation in previous work is known to exist.

The transformation used for grouping by word is an application of the "fold to groupBy" rule shown in FIG. 8. As shown in FIG. 5, groupBy clusters the elements of a collection of type M[A] according to the result of the function A→K. It returns a map from keys K to lists M[A] of elements in the original collection that map to a specific key. The rule matches any fold with a body which is an update of a collection at an index E that cannot be proved as distinct for each execution of the fold's body. (If the index is obviously distinct, the "extract map from fold" rule described herein is applied instead).

The output code first groups the elements of the collection by the index expression (groupBy λV·E), and then it folds each of the groups using the update expression B from original body of the loop. groupBy's output is a Map from each distinct value of E to the corresponding subset of the input collection. The map operation's parameters are k, which bounds to the keys of the grouped collection (i.e., evaluations of E), and l which contains subset of the input collection. The fold starts from the k value of $r_0$, and folds l using the operation C, which is original expression B with accesses to index E of the old reducer replaced with g, the new parameter corresponding only to the k-index of r.

The side condition requires that r does not appear in either the new expression C or the index expression E. Otherwise, the result of the of computation could depend on fold's evaluation order, so the transformation would not be correct. To avoid grouping by an invariant expression, resulting in a single group, the side condition also requires that E is dependent on some parameter in V.

Revisiting the original example, the expression below is the program before applying the rule (with a beta reduction applied to highlight to make the match clear):

fold $m\lambda mw \cdot m[w]:=m[w]+1$]

The outer m matches $r_0$, the inner m matches r, w matches E, and m[w]+1 matches B. The side conditions are satisfied, so the expression is rewritten to:

map($\lambda kl \cdot$fold $m[k](\lambda yx \cdot y+1)l$)$\circ$(groupBy $\lambda w \cdot w$)

Reference will now be made to localizing accesses. MapReduce platforms often require computations to be local, i.e., to be free of accesses of global data structures. The system contains rules to localize computations that do not meet this condition. Consider the following computation, based on an intermediate transformation of the wordcount example:

(map $\lambda kv \cdot m[k]$+size $v$)grouped

Here grouped maps each word to a list of occurrences and the map is summing the size of each list with existing counts in some map m. This code cannot be executed in MapReduce because it accesses the collection m, unless it is localized.

Localization is achieved by explicitly passing global data as a parameter to the relevant operations, using the built-in zip operation from FIG. 5. zip is overloaded to allow various input collection types. Its first version takes two maps with the same key type into a map from keys to pairs of values. If one of the maps is missing a value for a certain key, the zero value for the map's value type is used instead. For example: zip (M(1→8), M(2→9))=M(1→⟨8,0⟩,2→⟨(0, 9⟩). zip's second version takes a bag S and a map M and returns a map that retains only the entries from M with keys from S, e.g., zip (S(3), M(3→8,1→9,2→7))=M(3→8).

Using the zip operation, the map from the example above can be transformed to:

map($\lambda kvv_m \cdot v_m$+size $v$)zip(grouped,$m$)

The "localize map accesses" rule in FIG. 9 achieves this transformation. In this form, the map's operation only refers to data provided through its parameters, making it amenable to MapReduce execution. The "localize groupBy accesses" (FIG. 9) and "localize fold accesses" (not shown) achieve the same purpose for their respective operators.

Reference will now be made to loop optimizations and code motion. The rewrite system has many rules that are inspired from classic loop optimizations and code motion that permits the application of more rules during rewriting. These are detailed in FIGS. 11-13.

Reference will now be made to monoid-based transformations. Various transformation rules rely on viewing the map data structure as a monoid, i.e., a set with an associative binary operator and an identity element. Its identity is an empty map, while its "plus" operation (denoted by ⊕) is based on the "plus" of its value type parameters.

The sum of two maps, i.e., a⊕b, is another map with the same keys and the values the sum of their values. If a value is missing in either map, it is replaced by the value type's zero. At the bottom of FIG. 5 a possible implementation is given for the ⊕ based on zip.

Identifying computation that can be seen as operating over monoid structures allows further optimizations, since associativity can be exploited to expose more parallelism. FIG. 10 shows a set of monoid-based transformation rules. The first two rules are "enabling" rules that make code more amenable to other optimizations, while the final rule is itself an optimization.

To illustrate the "eliminate null check" rule in FIG. 10, an intermediate expression is revisited from the motivating example:

let prev=$m[w]_{in}$ $m[w]:=$(if prev==null then 0 else prev)+1]

Here, the conditional block can be eliminated by considering m a monoid with 0 as the identity element. Applying the rule yields:

let prev=$m[w]_{in}$ $m[w]:=$prev+1]

This transformation enables other optimizations by giving the code a more uniform structure.

As described above, it was shown how the inner loop of the wordcount code of FIG. 2 is transformed to a MapReduce form. Now explained are the last two rules of FIG. 10 by showing how they are used to optimize the full loop nest. The inner loop of FIG. 2 iterates over each line in the input. After beta reduction, and without assuming m is initially empty as was done above, its optimized form is:

(map $\lambda kv \cdot m[k]$+size $v$)$\circ$(groupBy id)

Placing this code in the context of the IR for the outer loop yields (after applying some non-monoid rules):

let$^{do\_count}$ = $^{(}$map λ k v . size$^{v)}$ ∘ $^{(}$groupBy $^{id)}$ in
$^m$ ++ ((map $^\lambda$ k<$v_1$,$v_2$> · $v_1 + v_2$ )
    (zip m (do _ count (splitString doc))))
fold m λ m <i,doc>.

This program can be simplified using the "identify map monoid plus" rule in FIG. 10. The m map and the value of (do_count (splitString doc)) are both maps from strings to numbers. Integer numbers are monoids with arithmetic addition as plus, so the maps can be seen as monoids with the ⊕ operator defined in FIG. 5. Zipping two monoids and adding up their corresponding values, as done above, is simply an implementation of the ⊕ operator. Thus, applying the rule rewrites the code to:

fold $^m$ $^\lambda$ $^m$ <i,doc>
    let do _ count = (map λ k v . size v) ∘ (groupBy id) in
        m ⊕ (do _ count (splitString doc))

do_count (splitString doc) does not depend on the m parameter, so can be extracted to a map using the "extract map from fold rule (see discussion above). Furthermore, the resulting map is split into a composition of maps through fission. The computation reaches this form:

$$\text{let}^{foldDocCount} = \text{fold m } \lambda \text{ m } <i,docCount>.$$
$$m \oplus docCount \text{ in}$$
foldDocCount ∘
(map $^{\lambda\ i}$ groups . (map $^{\lambda\ k\ v}$ · size v) groups) ∘
(map $^{\lambda\ i}$ split · groupBy$^{id}$ split)
(map $^{\lambda\ i\ doc}$ . splitString doc)

While the above computation reveals significant parallelism, the final fold, which merges the word count map for each document, is inefficient: it repeats the work of grouping results by word and summing counts. Notice that instead of doing all the operations for each doc and merging the results at the end, the program could start by merging all the docs and then computing word counts on the result. The "swap map with fold" shown in FIG. 10 achieves this transformation.

"swap map with fold" rewrites a composition of a fold over a monoid of M[B] using the monoid's plus (⊕) with a map using function $f$: A→B into an application of $f$ to the result of folding over maps input using monoid A's plus (⊞). The original value $r_0$ is also ⊕-added. Notice that the transformation eliminates the map operation, replacing it with a single application of $f$. Depending on the cost of $f$, this may result in significant speedups. The operation is correct as long as $f$ distributes over the monoid pluses, i.e., ∀ab·$f$(a⊞b)=$f$(a)⊕$f$(b).

All three map functions in the above programs have distributive operations. Thus, after three applications of the "swap map with fold" rule, three reductions of operations with identity, and some restructuring for readability, the following program is reached:

let foldStringPlus = fold " " λ bigDoc <i,doc>.
    bigDoc ⊕ doc in
let mapToSize =map λ k v . size v
in λ input . m ⊕ (mapToSize ∘ (groupBy id) ∘
    splitString ∘ foldStringPlus) input foldStringPlus is the counterpart of foldDocCount from the previous code version, but instead of merging count maps, it now merges string documents. Note that this program does not match the canonical MapReduce implementation, which (in essence) splits each document into words and then merges the word lists. It will be discussed below how MOLD can output either program, depending on the cost function.

Referring now once again to FIG. 11 (fusion-fission rules for merging and splitting map and fold operators), it is noted that as loops in original imperative program often update multiple variables, the initial Array SSA to Lambda phase generates fold operators reducing over tuples of those variables. Even after map operators are revealed, the operators sometimes still involves large tuples. The vertical fission rules in the figure split the operators operating over tuples into multiple operators going over parts of the original tuples. The fold vertical fission rule rewrites a fold reducing to a tuple into tuple of fold operators reducing to the same tuple. The map vertical fission achieves the same purpose for the input domain. The map horizontal fission is the counterpart of the traditional loop fission, splitting a map with a F o G into (map F) o (map G). The map fusion rule is its inverse.

Referring now again to FIG. 12 (simplifying and enabling transformations rules used by MOLD to enable the application of other rules as well as to simplify computation), it is noted that they also generate code which uses ++, an operation shown in FIG. 5. ++ takes two maps with the same type into a new map where the entries are the union of the maps, and any matching keys taking their value from the second map.

Presented now are some details regarding MOLD's implementation by following through the transformation phases in FIG. 1. The translation from Java to Array SSA is an extension of the SSA implementation in WALA [T. J. Watson Libraries for Analysis] to handle arrays and collections. The translation from Array SSA to the Lambda IR is implemented in Scala. For the rewrite system, extended was Kiama [A. M. Sloane. Lightweight language processing in Kiama. GTTSE III, pp. 408-425. Springer, 2011], a strategy-based term rewriting library for Scala. Support was added for state exploration, name-bindings aware operations (e.g., "subexpression of"), and cost-guided exploration modulo αβ-conversion. MOLD renames variables where necessary to solve name conflicts, and flattens let expressions to improve performance by the following rule:

$$\frac{\text{let } x = (\text{let } y = E_y \text{ in } E_x) \text{ in } \ldots}{\text{let } y = E_y \text{ in } (\text{let } x = E_x \text{ in } \ldots)}$$

The flattened let constructs translate to cleaner Scala code with less block nesting. MOLD generates Scala code from the lambda calculus IR by syntactic pretty-printing rules like (S is a function translating to Scala):

$$S(\lambda V \cdot F) \rightarrow \{S(V) = < S(F)\}$$

The let expressions are transformed to value declarations:

$$\text{let } X = Y \text{ in } Z \rightarrow \text{val } S(X) = S(Y); S(Z)$$

The Scala code is emitted using Kiama's pretty printing library [S. d. Swierstra and O. Chitil. Linear, bounded, functional pretty-printing. J. Funct. Program., 19(1):1-16, January 2009] and Ramsey's algorithm [N. Ramsey. Unparsing expressions with prefix and postfix operators. Software: Practice and Experience, 28(12):1327-1356, 1998] for minimal parenthesization.

The built-in data structures (FIG. 5) roughly follow the conventions for the Scala collection library. Code generated by the tool can be executed as traditional Scala code by simple implicit conversions [B. C. Oliveira, A. Moors, and M. Odersky. Type classes as objects and implicits. OOPSLA '10, pp. 341-360, 2010]. In a similar manner, a backend is provided based on the Spark MapReduce framework [M. Zaharia, M. Chowdhury, M. J. Franklin, S. Shenker, and I. Stoica. Spark: Cluster computing with working sets. Hot-Cloud'10, pp. 10-10, 2010]. This allows programs generated by the tool to be executed on Hadoop YARN clusters [V. K. Vavilapalli, A. C. Murthy, C. Douglas, S. Agarwal, M. Konar, R. Evans, T. Graves, J. Lowe, H. Shah, S. Seth, B. Saha, C. Curino, O. O'Malley, S. Radia, B. Reed, and E. Baldeschwieler. Apache Hadoop YARN: Yet another resource negotiator. SOCC 13, pp. 5:1-5:16, 2013].

Presented now is an experimental evaluation designed to answer the following research questions: (a). Can MOLD generate effective MapReduce code? Effective code is defined as satisfying three conditions: 1) it should not do redundant computation, 2) it should reveal a high level of parallelism, and 3) accesses to large data structures should be localized, to enable execution on a distributed memory MapReduce platform. (b) Is MOLD efficient? How long it takes for MOLD to find an effective solution is measured. (c) Is the proposed approach general? The core rewrite rules are shown as general and match many code scenarios. Also, discussed is how the disclosed cost optimization approach can generate effective solutions for different execution platforms.

To answer these questions, studied are the results of using MOLD to translate several sequential implementations of the Phoenix benchmarks [C. Ranger, R. Raghuraman, A. Penmetsa, G. Bradski, and C. Kozyrakis. Evaluating MapReduce for multi-core and multiprocessor systems. HPCA '07, pp. 13-24, 2007], a well-established MapReduce benchmark suite which provides both MapReduce and corresponding sequential implementations. The benchmark suite provides C implementations while the system described herein expects Java code as input. A manual, straightforward, syntactic, translation is made of the C sequential implementations to Java. C struct is transformed to simple Java data classes, functions to static methods, and arrays to Java arrays. Since Java does not have native multi-dimensional arrays, a separate Java class implementing two-dimensional array behavior is used. Also, methods that contain significant parts of the computation are inlined into a single Java method because MOLD currently compiles a method at a time.

To gauge the quality of the code generated by MOLD each program is passed through the tool, and the results are measured and evaluated. For each program: (a) we measure MOLD's execution time and log the sequence of applied rules to reach the optimal solution; (b) we check that the transformations preserved the semantics of the original program by executing both the original program and the generated one on the same input data set and asserting that the results are the same; (c) we manually inspect the code to check whether the operators going over large input data sets have been parallelized, and whether data accesses have been localized; (d) we execute the generated code on Spark [M. Zaharia, M. Chowdhury, M. J. Franklin, S. Shenker, and I. Stoica. Spark: Cluster computing with working sets. Hot-Cloud'10, pp. 10-10, 2010] and check that it generates the same output as the original program.

Reference will now be made to the question of can MOLD generate effective MapReduce code? In this regard, a discussion will be made of how MOLD generates MapReduce code for each of the subject programs (see the Table of FIG. 14).

With respect first to "WordCount," FIG. 2 shows the original sequential code, with the outer loop iterating over documents, and the inner loop iterating over each word in each document and updating a shared map (counts). One of the solutions found by MOLD is a map over all documents followed by a fold. The map contains a groupBy operation which computes a word count for each document (facilitated by the "fold to groupBy" rule). The fold merges the word counts across documents. While this is a good solution, merging word count maps may be expensive. Using the "swap map with fold" rule, MOLD moves the fold operation up the computation chain. In this way it reaches a form similar to the traditional MapReduce solution for the Word-Count problem. The documents are split into words, which are then shuffled (groupBy) and the numbers of elements in each word bucket is counted. It also goes one step further reaching a solution in which all the documents are first merged and then split into words (see the discussion of monoid-based transformations earlier). Depending on the executing platform, this may also be a valid, efficient solution.

The generated code exposes the maximal amount of parallelism for this case, and all accesses are localized so the code is distributable. FIGS. 15A and 15B list the transformation steps taken by the tool to reach the solutions discussed above.

With respect now to "Histogram," this benchmark poses a similar challenge to WordCount. It computes the frequency with which each RGB color component occurs within a large input data set. MOLD generates a solution similar to Word-Count. It first groups each color component by its values, and then maps to the size of the groups. Given a cost function which puts a higher weight on groupBy operations, MOLD can also generate a solution where the input data set is tiled and a map goes over each tile to compute its histogram, and the resulting histograms are merged by a final fold. This is similar to the approach taken by the Phoenix MapReduce solution.

The generated code is parallel and accesses are localized. The Phoenix implementation assumes the input is a single array encoding the RGB channels. The "fold vertical fission" rules split the computation by channel but cannot eliminate the direct stride accesses to the input array. To localize the accesses, the tool assumes the MapReduce implementation has a function selectEveryWithOffset(k,o) which takes every kth element of the input starting with offset o.

With respect now to "Linear Regression and String Match," these two benchmarks are less challenging. MOLD brings them both to a parallelized and localized form by an application of "extract map from fold" followed by an application of "localize map accesses".

With respect now to "Matrix Product," matrix multiplication is a classic problem with many possible parallel and distributed implementations. The solution reached by MOLD under the cost function targeting MapReduce is a nesting of three map operators. Considering the input arrays a and b, the outer map goes over a's rows, the middle map goes over b-transposed's rows (i.e., goes over b's columns), and the inner operation zips a's row with b's column, then it maps with the multiplication operation, and finally it sums up the products. The generated code allows fine grained parallelism and it has good localization of accesses.

With respect now to "PCA and KMeans," generally, for these benchmarks the generated code exposes good parallelism and access localization, but the generated code is not optimal. In PCA, there are three redundant maps and one redundant fold, out of a total of twelve operators. They are leftover due to some limitations of the code motion rules in handling complex tuple structures. In both cases the transformation leaves some additional noop restructuring of the results at the end of the computation pipeline. Considering that the transformation is source-to-source, a programmer could identify and fix these issues, while still benefiting from having most of the algorithm well parallelized.

With respect now to "Backends," for five of the benchmarks, the Scala generated code type-checks. For the remaining two, types had to be added where MOLD could not infer them due to type erasure in the input Java bytecode. Using the backends described in the implementation discussed above, all benchmarks were executed using the Scala collections backend, and five of the benchmarks were executed on Spark. The remaining two benchmarks, Matrix Product and PCA, were not executable on Spark due to current limitations of the framework (it does not allow nested distributed data structures).

Reference will now be made to the question of is MOLD efficient? In this regard, experiments were run on a quad-core Intel Core i7 at 2.6 GHz (3720QM) with 16 GB of RAM. MOLD's rewrite system state exploration is parallelized.

Table 1, shown in FIG. 14, reports the MOLD execution in column 4. For all but one program, the tool reaches the solution in under 4 minutes, and in some cases, MOLD is fast enough that it could run interactively, with the programmer getting the translated code within tens of seconds. The outlier is KMeans, which is a larger program compared to the others and has separated nested loops and complex control structure.

Reference will now be made to the question of is the proposed approach general? It can be said that a rewrite rule set is general if it can be used to reach effective solutions for multiple programs, and each good solution depends on the application of multiple rules. Columns 5-9 of Table 1 (see FIG. 14) show, for each program, the number of applications for each of the rule groups presented above with respect to optimization rules. The "extract map from fold" rule (column 5) is required in all but one of the programs. The "fold to groupBy" rule (column 6) is used for WordCount and Histogram, the two programs with indirect accesses. Upon inspection, it was found that the previous two rules parallelized the computationally expensive sections of the programs. Furthermore, the access localization rules are useful in all cases (column 7). With the exception of Linear Regression and String Match, all other programs also require the application of classic loop optimization and code motion transformations.

Reference will now be made to certain related work. First, with respect to "Inspector-Executor", it is noted that MOLD exposes parallelism using the fold to groupBy rewrite that introduces shuffle operations to move data to computation. This particularly benefits imperative loops that update a global data structure with irregular access patterns, as in wordcount.

This mechanism is akin to inspector-executor frameworks where (1) at runtime, an inspector curates data access patterns for a loop body and determines an ordering for retrieving data values, and (2) an executor fetches the values from remote memory locations in the specified order and executes the loop body. This model is used for irregular reference patterns over sparse data structures to improve spatial locality and hide memory access latency. Initial inspector-executor transformations were applied manually [R. Das, M. Uysal, J. Saltz, and Y.-S. Hwang. Communication optimizations for irregular scientific computations on distributed memory architectures. Journal of Parallel and Distributed Computing, 22(3):462-478, September 1994]. Numerous advances have automated the process and introduced advanced data reordering that combine static and runtime analysis (e.g., [M. M. Strout, L. Carter, and J. Ferrante. Compile-time composition of run-time data and iteration reorderings. PLDI '03, pp. 91-102, 2003] and [M. Ravishankar, J. Eisenlohr, L.-N. Pouchet, J. Ramanujam, A. Rountev, and P. Sadayappan. Code generation for parallel execution of a class of irregular loops on distributed memory systems. SC '12, pp. 72:1-72:11, 2012]). In [M. M. Strout, L. Carter, and J. Ferrante. Compile-time composition of run-time data and iteration reorderings. PLDI '03, pp. 91-102, 2003], the authors showed that sequences of loop transformations (e.g., data reordering, iteration reordering, tiling) can be legally composed at compile time to yield better performance for indirect memory references.

MOLD differs from inspector-executor models in a number of ways. By rewriting loops into a functional style with high level operators, a level of abstraction is retained that is not available when loops are decomposed into explicit inspector and executor loops. Further, MOLD operators may be mapped to more general parallel execution frameworks that include MapReduce, as has been shown herein.

With respect now to "MapReduce", it is noted that MapReduce offers a programming model for parallel computing that is convenient and scalable, for applications that fit the paradigm. It frees the programmer from the burden of orchestrating communication in a distributed or parallel system, leaving such details to the MapReduce framework which may offer other benefits as well. For this reason, it is often the target of compilation from annotated sequential codes or domain-specific languages. As described herein, an aim has been to apply a source-to-source transformation to MapReduce directly from unmodified sequential (Java) code.

The prevalence of general purpose GPUs has catalyzed the interest in source-to-source transformations from sequential codes to parallel orchestration languages (e.g., OpenMP, OpenCL) or GPU languages (e.g., CUDA). In [C. Nugteren and H. Corporaal. Introducing Bones: a parallelizing source-to-source compiler based on algorithmic skeletons. GPGPU-5, pp. 1-10, 2012] for example, a number of these approaches are evaluated and a new skeleton-based compiler is described. A common theme in these efforts is the reliance on a programmer to identify and annotate their source code to aid the compiler in generating a suitable and correct parallel implementation. In comparison, MOLD automatically discovers if a loop is suitable for translation into a MapReduce style and applies term rewriting rules to enumerate a number of candidate implementations.

In [S.-w. Liao. Parallelizing user-defined and implicit reductions globally on multiprocessors. ACSAC'06, pp. 189-202, 2006], the author describes a compiler analysis for recognizing parallel reductions. This analysis relies on array dataflow analysis [M. H. Hall, S. P. Amarasinghe, B. R. Murphy, S.-W. Liao, and M. S. Lam. Detecting coarse-grain parallelism using an interprocedural parallelizing compiler. Supercomputing '95, 1995] to summarize data that is reachable and modified within a loop, and is applicable when memory aliases can be disambiguated. An important differentiator in the work disclosed herein is the use of groupBy which affords the ability to resolve data aliases via MapReduce shuffle operations.

The MOLD internal representation is derived from a program in array SSA form, extending previous observations that a program in SSA form is essentially a functional program [A. W. Appel. SSA is functional programming. SIGPLAN Not., 33(4):17-20, April 1998; R. A. Kelsey. A correspondence between continuation passing style and static single assignment form. IR '95, pp. 13-22, 1995]. This functional representation is the basis for the transformations described herein to rewrite imperative loops into a MapReduce style. MOLD leverages the power of functional programming [R. Lämmel. Google's MapReduce programming model—revisited. Science of Computer Programming, 70(1):1-30, 2008.] and its algebraic properties [R. S. Bird. Algebraic identities for program calculation. Comput. J., 32(2):122-126, April 1989; E. Meijer, M. Fokkinga, and R. Paterson. Functional programming with bananas, lenses, envelopes and barbed wire. FPCA '91, pp. 124-144, 1991]. Many of these properties are used in the optimization rules described herein.

With respect now to "Program synthesis and refactoring", it is noted that an extensive body of work concerns the use of program synthesis techniques to generate efficient code. Particularly relevant is superoptimization, where program forms are enumerated and checked against supplied test cases to find a desired code sequence. This may be exhaustive as in the original superoptimizer, goal-oriented [R. Joshi, G. Nelson, and K. Randall. Denali: A goal-directed superoptimizer. PLDI '02, pp. 304-314, 2002], or stochastic [E. Schkufza, R. Sharma, and A. Aiken. Stochastic superoptimization. ASPLOS '13, pp. 305-316, 2013]. In many of these applications, the context is a peephole optimizer that reorders the instructions of a critical inner loop at ISA-level. This is also the case for component based program synthesis [S. Gulwani, S. Jha, A. Tiwari, and R. Venkatesan. Synthesis of loop-free programs. PLDI '11, pp. 62-73, 2011]. In contrast, the work described herein is a source-to-source transformation that applies a much larger scale refactoring to loops from an imperative code sequence to a functional MapReduce style.

There is also work on refactoring toward parallelism or a more functional form. For example, [D. Dig, M. Tarce, C. Radoi, M. Minea, and R. Johnson. Relooper: Refactoring for loop parallelism in java. OOPSLA '09, pp. 793-794, 2009] proposes a refactoring tool to parallelize Java loops, and [L. Franklin, A. Gyori, J. Lahoda, and D. Dig. Lambdaficator: From imperative to functional programming through automated refactoring. ICSE '13, pp. 1287-1290, 2013] presents an automated refactoring of Java code to use the Java 8 collection operators. Both approaches transform the original program AST directly and are limited to specific access patterns.

As described herein, MOLD is a tool that automatically translates sequential, imperative code into code suitable for parallel MapReduce execution. MOLD first translates input code into a functional intermediate representation, preserving loop structures using fold operations. Then, MOLD searches the space of equivalent programs for an effective MapReduce implementation, based on a set of rewrite rules and a cost function that can be tuned for particular architectures. In contrast to previous work, MOLD can effectively handle irregular array accesses by introducing groupBy operations, which translate directly to MapReduce shuffle operations. The evaluation that was presented showed that MOLD generated the desired MapReduce output for several real-world kernels, including codes like wordcount that are beyond previous techniques.

Figure 17A:
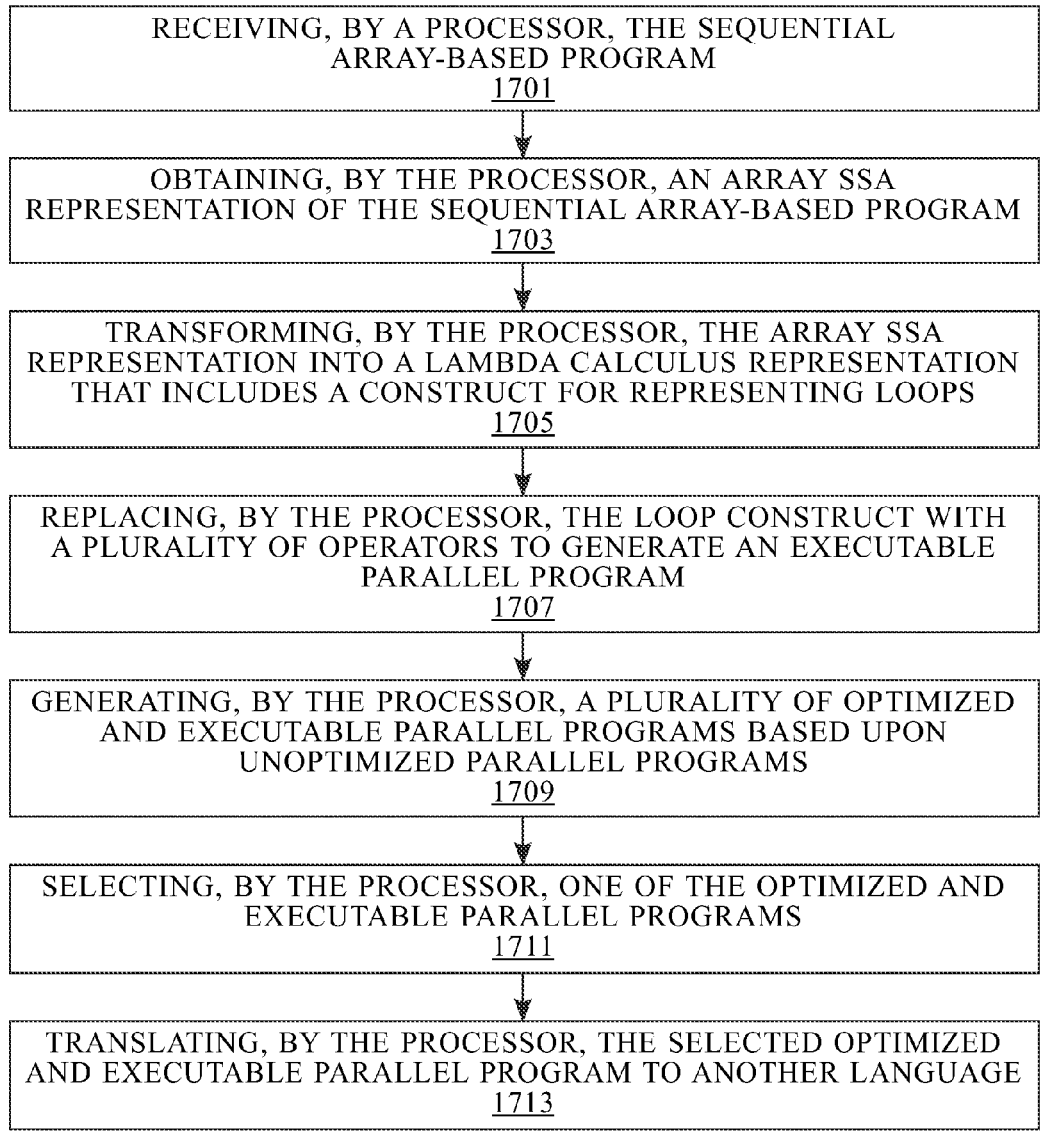
FIG. 17A depicts a block diagram of a method according to an embodiment of the present invention and FIG. 17B depicts a block diagram of a method according to an embodiment of the present invention.

Referring now to FIG. 17A, a method for automatic conversion of a sequential array-based program to a parallel MapReduce program is shown. As seen in FIG. 17A, the method of this embodiment comprises: at 1701—receiving, by the processor, the sequential array-based program; at step 1703—obtaining, by the processor, an Array SSA representation of the sequential array-based program; at 1705—transforming, by the processor, the Array SSA representation into a Lambda Calculus representation that includes a construct for representing loops; at 1707—replacing, by the processor, the loop construct with a plurality of operators to generate an executable parallel program (in one example, the replacing of the loop construct generates a plurality of unoptimized parallel programs); at 1709—generating, by the processor, a plurality of optimized and executable parallel programs based upon the unoptimized parallel programs; at 1711—selecting, by the processor, one of the optimized and executable parallel programs; and at 1713—translating, by the processor, the selected optimized and executable parallel program to another language.

Figure 17B:
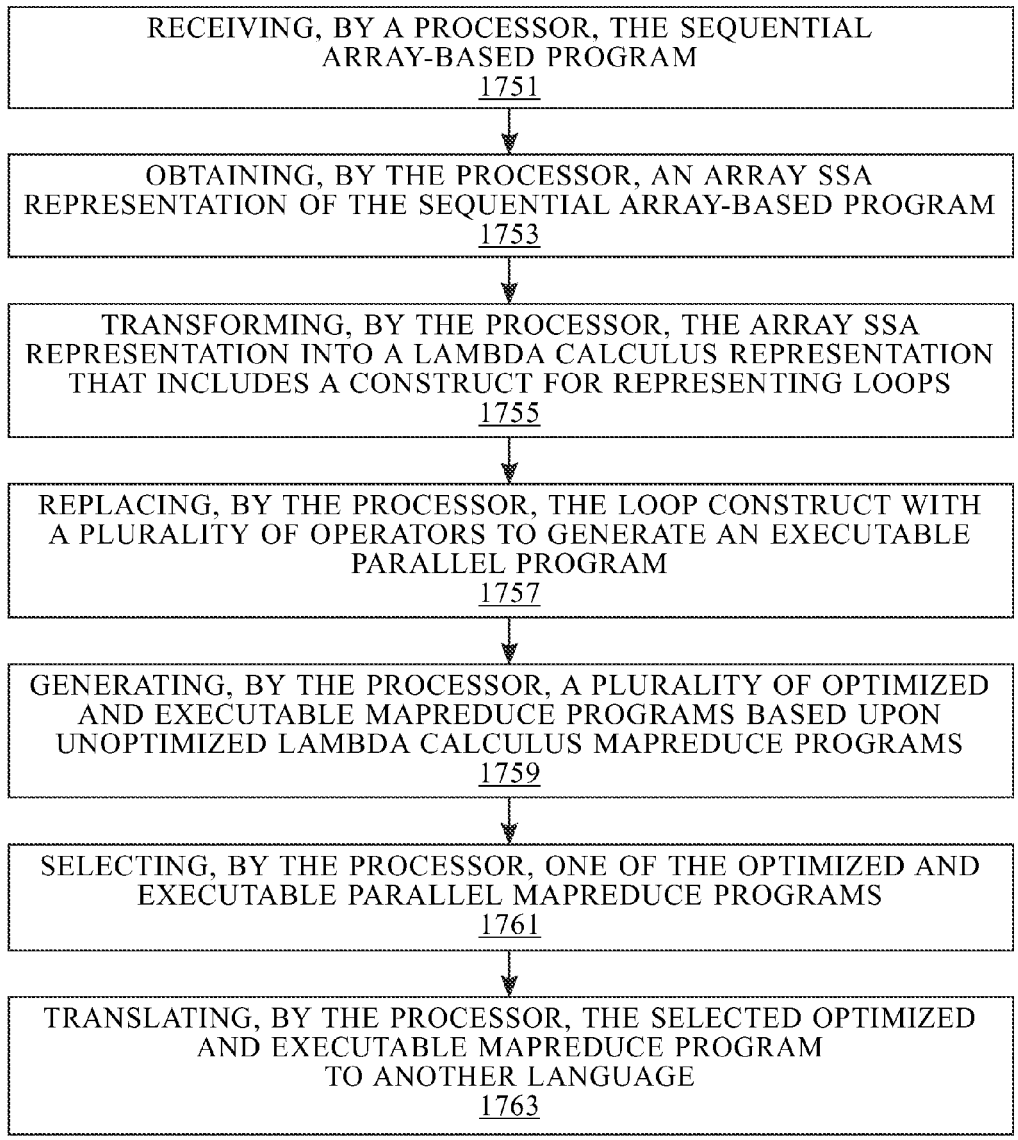

Referring now to FIG. 17B, a method for automatic conversion of a sequential array-based program to a parallel MapReduce program is shown. As seen in FIG. 17B, the method of this embodiment comprises: at 1751—receiving, by the processor, the sequential array-based program; at step 1753—obtaining, by the processor, an Array SSA representation of the sequential array-based program; at 1755—transforming, by the processor, the Array SSA representation into a Lambda Calculus representation that includes a construct for representing loops; at 1757—replacing, by the processor, the loop construct with a plurality of operators to generate an executable parallel program (in one example, the replacing of the loop construct uses a plurality of MapReduce operators to generate a plurality of unoptimized Lambda Calculus MapReduce programs); at 1759—generating, by the processor, a plurality of optimized and executable MapReduce programs based upon the unoptimized Lambda Calculus MapReduce programs; at 1761—selecting, by the processor, one of the optimized and executable MapReduce programs; and at 1763—translating, by the processor, the selected optimized and executable MapReduce program to another language.

In one example, any steps may be carried out in the order recited or the steps may be carried out in another order.

In another example, the parallel program may support at least: map, reduce, and shuffle (group by).

Figure 18:
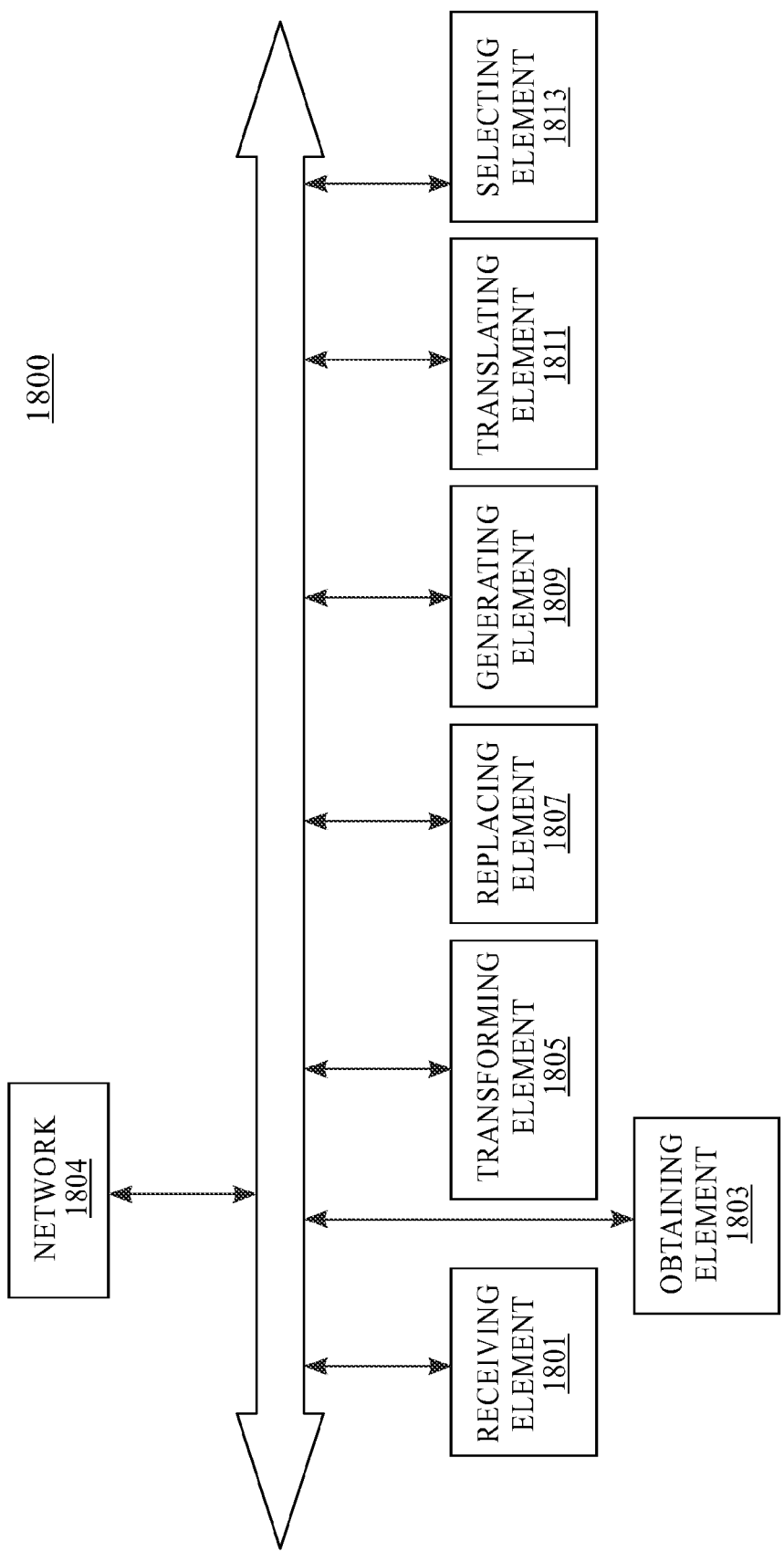
FIG. 18 depicts a block diagram of a system according to an embodiment of the present invention.

Referring now to FIG. 18, in another embodiment, a computer system 1800 for automatic conversion of a sequential array-based program to a parallel MapReduce program is provided. This computer system may include the following elements: a receiving element 1801 configured to receive the sequential array-based program; an obtaining element 1803 configured to obtain an Array SSA representation of the sequential array-based program; a transforming element 1805 configured to transform the Array SSA representation into a Lambda Calculus representation that includes a construct for representing loops; and a replacing element 1807 configured to replace the loop construct with a plurality of operators to generate an executable parallel program.

Still referring to FIG. 18, in one embodiment: generating element 1809 is configured to generate a plurality of optimized and executable parallel programs based upon the unoptimized parallel programs; selecting element 1813 is configured to select one of the optimized and executable parallel programs; and translating element 1811 is configured to translate the selected optimized and executable parallel program to another language.

Still referring to FIG. 18, in another embodiment: generating element 1809 is configured to generate a plurality of optimized and executable MapReduce programs based upon the unoptimized Lambda Calculus MapReduce programs; selecting element 1813 is configured to select one of the optimized and executable MapReduce programs; and translating element 1811 is configured to translate the selected optimized and executable MapReduce program to another language.

Still referring to FIG. 18, each of the elements may be operatively connected together via system bus 1802. In one example, communication between and among the various elements may be bi-directional. In another example, communication may be carried out via network 1804 (e.g., the Internet, an intranet, a local area network, a wide area network and/or any other desired communication channel(s)). In another example, some or all of these elements may be implemented in a computer system of the type shown in FIG. 19.

Figure 19:
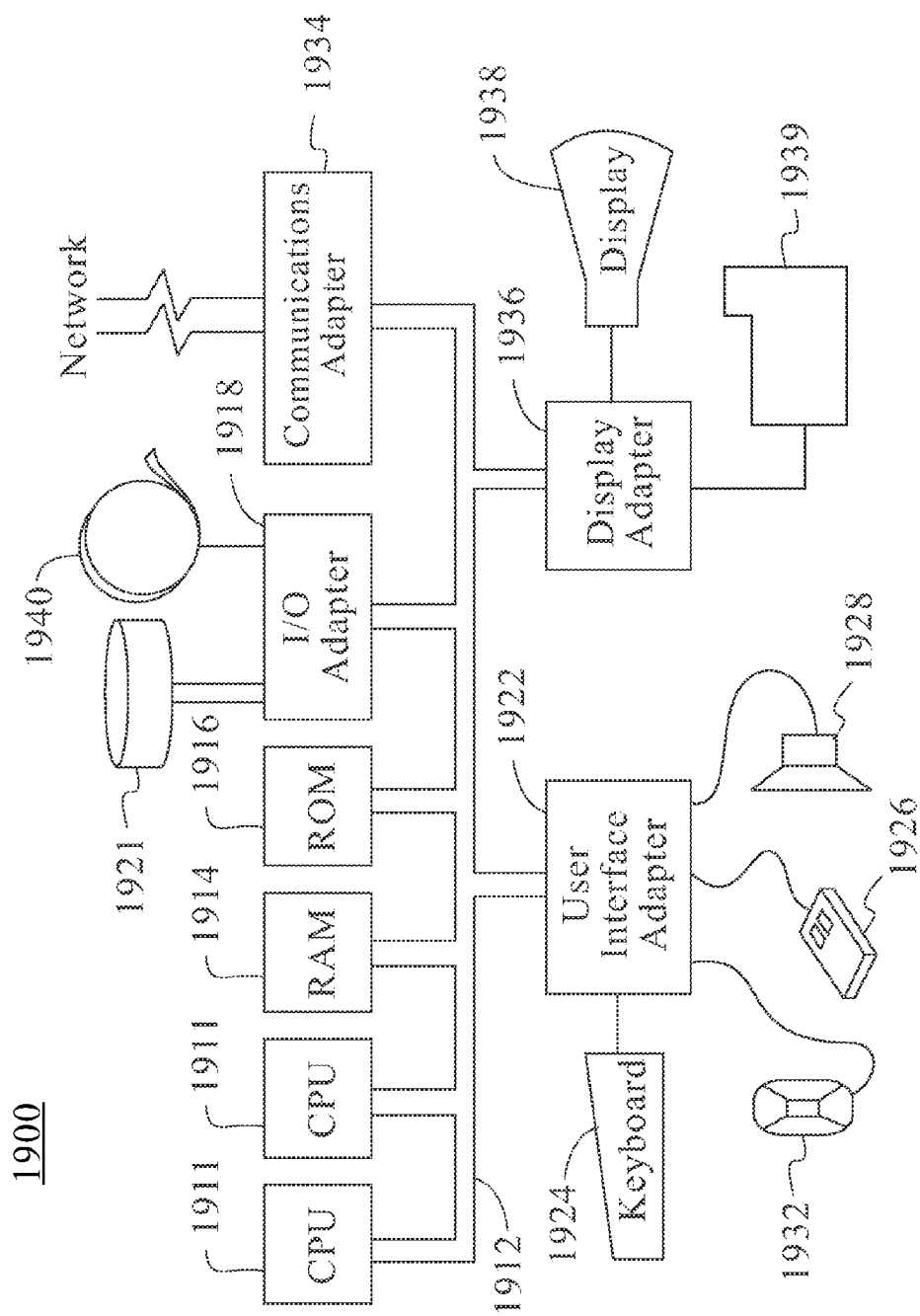
FIG. 19 depicts a block diagram of a system according to an embodiment of the present invention.

Referring now to FIG. 19, this figure shows a hardware configuration of computing system 1900 according to an embodiment of the present invention. As seen, this hardware configuration has at least one processor or central processing unit (CPU) 1911. The CPUs 1911 are interconnected via a system bus 1912 to a random access memory (RAM) 1914, read-only memory (ROM) 1916, input/output (I/O) adapter 1918 (for connecting peripheral devices such as disk units 1921 and tape drives 1940 to the bus 1912), user interface adapter 1922 (for connecting a keyboard 1924, mouse 1926, speaker 1928, microphone 1932, and/or other user interface device to the bus 1912), a communications adapter 1934 for connecting the system 1900 to a data processing network, the Internet, an Intranet, a local area network (LAN), etc., and a display adapter 1936 for connecting the bus 1912 to a display device 1938 and/or printer 1939 (e.g., a digital printer or the like).

In one embodiment, a method for automatic conversion of a sequential array-based program to a parallel program is provided, the method comprising: obtaining, by a processor, an Array SSA representation of the sequential array-based program; transforming, by the processor, the Array SSA representation into a Lambda Calculus representation that includes a construct for representing loops; and replacing, by the processor, the loop construct with a plurality of operators to generate an executable parallel program.

In one example, the replacing of the loop construct generates a plurality of unoptimized parallel programs.

In another example, the method further comprises: generating, by the processor, a plurality of optimized and executable parallel programs based upon the unoptimized parallel programs; selecting, by the processor, one of the optimized and executable parallel programs; and translating, by the processor, the selected optimized and executable parallel program to another language.

In another example, the replacing of the loop construct uses a plurality of MapReduce operators to generate a plurality of unoptimized Lambda Calculus MapReduce programs.

In another example, the method further comprises: generating, by the processor, a plurality of optimized and executable MapReduce programs based upon the unoptimized Lambda Calculus MapReduce programs; selecting, by the processor, one of the optimized and executable MapReduce programs; and translating, by the processor, the selected optimized and executable MapReduce program to another language.

In another example, at least one of: (a) the translating translates the selected optimized and executable MapReduce program back to a high-level language; (b) the translating translates the selected optimized and executable MapReduce program to machine code; and (c) the translating translates the selected optimized and executable MapReduce program in a form for use in a hardware circuit.

In another example, the method comprises receiving, by the processor, the sequential array-based program.

In another example, the obtaining comprises transforming, by the processor, the received sequential array-based program into the Array SSA representation of the sequential array-based program.

In another example, the replacing is performed using term rewrite rules.

In another example, the generating comprises applying optimizations comprising loop fusion to the unoptimized Lambda Calculus MapReduce programs.

In another example, the sequential array-based program of which the processor obtains an Array SSA representation is in a first high-level language and the optimized parallel programs are translated back to the first high-level language.

In another example, the sequential array-based program of which the processor obtains an Array SSA representation is in a first high-level language and the optimized parallel programs are translated back to a second high-level language that is different from the first high-level language.

In another example, the selecting is performed via at least one of: (a) analysis of parallelism; (b) performance testing; or (c) any combination thereof.

In another embodiment, a computer program product for automatic conversion of a sequential array-based program to a parallel program is provided, the program code of the computer program product executable by at least one computer to perform a method comprising: obtaining an Array SSA representation of the sequential array-based program; transforming the Array SSA representation into a Lambda Calculus representation that includes a construct for representing loops; and replacing the loop construct with a plurality of operators to generate an executable parallel program.

In one example, the replacing of the loop construct generates a plurality of unoptimized parallel programs.

In another example, the program code of the computer program product, when executing, further performs the step of: generating a plurality of optimized and executable parallel programs based upon the unoptimized parallel programs; selecting one of the optimized and executable parallel programs; and translating the selected optimized and executable parallel program to another language.

In another example, the replacing of the loop construct uses a plurality of MapReduce operators to generate a plurality of unoptimized Lambda Calculus MapReduce programs.

In another example, the program code of the computer program product, when executing, further performs the step of: generating a plurality of optimized and executable MapReduce programs based upon the unoptimized Lambda Calculus MapReduce programs; selecting one of the optimized and executable MapReduce programs; and translating the selected optimized and executable MapReduce program to another language.

In another example, at least one of: (a) the translating translates the selected optimized and executable MapReduce program back to a high-level language; (b) the translating translates the selected optimized and executable MapReduce program to machine code; and (c) the translating translates the selected optimized and executable MapReduce program in a form for use in a hardware circuit.

In another embodiment, a computer-implemented system for automatic conversion of a sequential array-based program to a parallel program is provided, the system comprising: an obtaining element configured to obtain an Array SSA representation of the sequential array-based program; a transforming element configured to transform the Array SSA representation into a Lambda Calculus representation that includes a construct for representing loops; and a replacing element configured to replace the loop construct with a plurality of operators to generate an executable parallel program.

In one example, the replacing of the loop construct generates a plurality of unoptimized parallel programs.

In another example, the system further comprises: a generating element configured to generate a plurality of optimized and executable parallel programs based upon the unoptimized parallel programs; a selecting element configured to select one of the optimized and executable parallel programs; and a translating element configured to translate the selected optimized and executable parallel program to another language.

In another example, the replacing of the loop construct uses a plurality of MapReduce operators to generate a plurality of unoptimized Lambda Calculus MapReduce programs.

In another example, the system further comprises: a generating element configured to generate a plurality of optimized and executable MapReduce programs based upon the unoptimized Lambda Calculus MapReduce programs; a selecting element configured to select one of the optimized and executable MapReduce programs; and a translating element configured to translate the selected optimized and executable MapReduce program to another language.

In another example, at least one of: (a) the translating element is configured to translate the selected optimized and executable MapReduce program back to a high-level language; (b) the translating element is configured to translate the selected optimized and executable MapReduce program to machine code; and (c) the translating element is configured to translate the selected optimized and executable MapReduce program in a form for use in a hardware circuit.

In other examples, any steps described herein may be carried out in any appropriate desired order.

In another example, a plurality of independent services (e.g., that are not part of the same computer program but are distinct services that run on different computers or as cloud service offerings) may perform any of the steps disclosed herein.

As described herein the following are provided: (a) An automatic translation from imperative array-based code to a functional intermediate representation, amenable to generating MapReduce programs. Critically, the translation represents loops as fold operations, preserving their structure for further optimization; (b) A rewriting system to generate a broad space of equivalent MapReduce programs for a given imperative program from functional IR. The space is explored via heuristic search based on a cost function that can be customized for different backends; (c) A rewrite rule that introduces groupBy operations to effectively handle complex indirect array accesses. This novel technique is critical for handling basic MapReduce examples like "word count"; (d) An implementation of techniques in a tool called MOLD, and an experimental evaluation showing its ability to handle complex input programs beyond those in the previous work.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer program product comprising a physical memory configured for automatic conversion of a sequential array-based program to a parallel program, the program code of the computer program product executable by at least one computer to perform a method comprising:
    obtaining an Array static single assignment (SSA) representation of the sequential array-based program;
    transforming the Array SSA representation into a Lambda Calculus representation that includes a construct for representing loops; and
    replacing the loop construct with a plurality of operators to generate a plurality of unoptimized parallel programs comprising a plurality of operations;
    generating a plurality of optimized and executable parallel programs based upon the unoptimized parallel programs, wherein the plurality of optimized and executable parallel programs are configured for accessing a plurality of memory locations including at least two overlapping memory locations;
    grouping a plurality of operations performed by the optimized and executable parallel programs based upon the plurality of memory locations;
    ranking the optimized and executable parallel programs by applying the grouped plurality of operations to a customizable cost function; and
    performing a heuristic search to select one of the optimized and executable parallel programs from the plurality of optimized and executable parallel programs.

2. The computer program product of claim 1, wherein the program code of the computer program product, when executing, further performs the step of:
    translating the selected optimized and executable parallel program to another language.

3. The computer program product of claim 1, wherein, the replacing of the loop construct uses a plurality of MapReduce operators to generate a plurality of unoptimized Lambda Calculus MapReduce programs.

4. The computer program product of claim 3, wherein the program code of the computer program product, when executing, further performs:
    generating a plurality of optimized and executable MapReduce programs based upon the unoptimized Lambda Calculus MapReduce programs;
    selecting one of the optimized and executable MapReduce programs; and
    translating the selected optimized and executable MapReduce program to another language.

5. The computer program product of claim 4, wherein:
    (a) the translating translates the selected optimized and executable MapReduce program back to a high-level language; and
    (b) the translating translates the selected optimized and executable MapReduce program in a form for use in a hardware circuit.

6. A computer-implemented system for automatic conversion of a sequential array-based program to a parallel program, the system comprising a memory operatively coupled to a processor and configured to provide:
    an obtaining element configured to obtain an Array static single assignment (SSA) representation of the sequential array-based program;
    a transforming element configured to transform the Array SSA representation into a Lambda Calculus representation that includes a construct for representing loops; and
    a replacing element configured to replace the loop construct with a plurality of operators to generate a plurality of unoptimized parallel programs comprising a plurality of operations;

a generating element configured to generate a plurality of optimized and executable parallel programs based upon the unoptimized parallel programs, wherein the plurality of optimized and executable parallel programs are configured for accessing a plurality of memory locations including at least two overlapping memory locations;

a grouping element configured to group a plurality of operations performed by the optimized and executable parallel programs based upon the plurality of memory locations;

a ranking element configured to rank the optimized and executable parallel programs by applying the grouped plurality of operations to a customizable cost function; and a selecting element configured to perform a heuristic search to select one of the optimized and executable parallel programs from the plurality of optimized and executable parallel programs.

7. The system of claim 6, further comprising:

a translating element configured to translate the selected optimized and executable parallel program to another language.

8. The system of claim 6, wherein, the replacing of the loop construct uses a plurality of MapReduce operators to generate a plurality of unoptimized Lambda Calculus MapReduce programs.

9. The system of claim 8, wherein:

the generating element is further configured to generate a plurality of optimized and executable MapReduce programs based upon the unoptimized Lambda Calculus MapReduce programs;

the selecting element is further configured to select one of the optimized and executable MapReduce programs; and a translating element is configured to translate the selected optimized and executable MapReduce program to another language.

10. The system of claim 9, wherein:

(a) the translating element is configured to translate the selected optimized and executable MapReduce program back to a high-level language; and (b) the translating element is configured to translate the selected optimized and executable MapReduce program in a form for use in a hardware circuit.

* * * * *